US008072676B2

(12) United States Patent
Ratti et al.

(10) Patent No.: US 8,072,676 B2
(45) Date of Patent: *Dec. 6, 2011

(54) PROGRAMMABLE WINDOW: A DEVICE FOR CONTROLLING THE OPACITY OF SMALL-SCALE AREAS WITHIN A LARGE-SCALE TRANSPARENT MEMBRANE

(75) Inventors: Carlo Ratti, Turin (IT); Assaf Biderman, Boston, MA (US); Martin Ramos, Lima (PE)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,057

(22) Filed: Aug. 4, 2010

(65) Prior Publication Data

US 2010/0328757 A1 Dec. 30, 2010

Related U.S. Application Data

(63) Continuation of application No. 11/247,936, filed on Oct. 11, 2005, now Pat. No. 7,796,322.

(60) Provisional application No. 60/617,223, filed on Oct. 8, 2004.

(51) Int. Cl.
*G02B 26/00* (2006.01)
*G09G 3/34* (2006.01)
*G02B 5/30* (2006.01)

(52) U.S. Cl. ......... 359/296; 359/290; 345/107; 252/585

(58) Field of Classification Search ............... 359/296, 359/290; 345/107; 252/585
See application file for complete search history.

(56) References Cited

U.S. PATENT DOCUMENTS

| 3,341,274 | A | * | 9/1967 | Marks | 359/296 |
| 3,708,219 | A | * | 1/1973 | Forlini et al. | 359/253 |
| 3,848,964 | A | * | 11/1974 | Marks | 359/296 |
| 4,131,334 | A | | 12/1978 | Witte et al. | |
| 4,280,754 | A | | 7/1981 | Yano et al. | |
| 5,461,506 | A | | 10/1995 | Check, III et al. | |
| 5,463,491 | A | | 10/1995 | Check, III | |
| 5,463,492 | A | * | 10/1995 | Check, III | 359/296 |
| 6,114,405 | A | * | 9/2000 | Zhuang et al. | 522/99 |
| 6,429,961 | B1 | * | 8/2002 | Harary et al. | 359/296 |
| 6,631,023 | B1 | | 10/2003 | Berneth et al. | |
| 6,795,226 | B2 | * | 9/2004 | Agrawal et al. | 359/265 |
| 6,804,040 | B2 | * | 10/2004 | Malvino et al. | 359/296 |
| 6,897,997 | B2 | * | 5/2005 | Malvino | 359/296 |
| 7,042,643 | B2 | * | 5/2006 | Miles | 359/578 |

(Continued)

FOREIGN PATENT DOCUMENTS

CA 972857 8/1975

*Primary Examiner* — Basil Katcheves
*Assistant Examiner* — Ryan Kwiecinski
(74) *Attorney, Agent, or Firm* — Gesmer Updegrove LLP

(57) ABSTRACT

Disclosed is a system and method to affect natural lighting profiles in a programmable window made from a single transparent membrane, wherein the method comprises: forming a matrix comprising of pixel elements within the single transparent membrane, setting (in a programmable controller) a degree of shading in at least one pixel in the matrix, receiving control command(s) from the programmable controller and, in response to the control command(s), independently driving the pixel(s) within the single transparent membrane to set its/their opacity according to the degree of shading. The degree of shading in each pixel within the single transparent membrane is controlled by controlling percentage of light transmitted according to the control command(s) issued by the programmable controller.

5 Claims, 23 Drawing Sheets

U.S. PATENT DOCUMENTS

| | | | |
|---|---|---|---|
| 2002/0126364 A1* | 9/2002 | Miles | 359/247 |
| 2003/0227663 A1* | 12/2003 | Agrawal et al. | 359/265 |
| 2004/0160388 A1* | 8/2004 | O'Keeffe | 345/30 |
| 2004/0165251 A1* | 8/2004 | Malvino et al. | 359/296 |
| 2004/0185195 A1* | 9/2004 | Anderson et al. | 428/34 |
| 2005/0233125 A1* | 10/2005 | Anderson et al. | 428/221 |
| 2006/0107616 A1* | 5/2006 | Ratti et al. | 52/750 |
| 2007/0229936 A1* | 10/2007 | Miles | 359/291 |
| 2008/0261159 A1* | 10/2008 | Chopra et al. | 430/319 |

* cited by examiner

PROGRAMMABLE WINDOW: A DEVICE FOR CONTROLLING THE OPACITY OF SMALL-SCALE AREAS WITHIN A LARGE-SCALE TRANSPARENT MEMBRANE

RELATED APPLICATIONS

This application is a Continuation of U.S. application Ser. No. 11/247,936 filed Oct. 11, 2005, now U.S. Pat. No. 7,796,322, which claims priority to U.S. Provisional Application No. 60/617,223, filed on Oct. 8, 2004, both of which are incorporated herein by reference in their entireties.

BACKGROUND OF THE INVENTION

1. Field of Invention

The present invention relates generally to the field of environmental control and transparent displays. More specifically, the present invention is related to a programmable electronic device for controlling the opacity of small-scale areas within a large-scale transparent membrane for applications in architecture.

2. Discussion of Prior Art

The current range of possibilities for displaying information on a building-scale includes all forms of static and illuminated signs and panels, projections, as well as building-sized LED panels and one directional OLED display arrays. The problem with most of the above is that the display device completely blocks light. For instance, in the case of façade displays such as those in Times Square, NY, there is no view or natural light inside the buildings used as displays, and similarly in the case of window scale displays. In the case of OLED display arrays, while light can travel across them, there is no efficient method for regulating the amount of light that does go through.

For the purpose of dynamic environmental control there is also existing work in the field of Liquid Crystal (LC), Suspended Particle Devices (SPD) and Electrochromic Devices (ECD). These are used to control the amount of light that crosses windows, mirrors, and alike in a variety of applications. No work has been done in pixellating these materials to produce a large scale display and accurate environmental control device with architectural applications.

SUMMARY OF THE INVENTION

The present invention provides for a method to affect natural lighting profiles in a programmable window made from a single transparent membrane, wherein the method comprises the steps of: (1) forming a matrix comprising a plurality of pixel elements within the single transparent membrane, each of the one or more pixels being wired using a transparent conductor and capable of being independently driven to control opacity; (2) setting in a programmable controller a degree of shading in at least one pixel in the matrix of pixel elements; (3) receiving one or more control commands from the programmable controller, the control commands issued to control opacity of at least one pixel element in the matrix; (4) in response to the one or more control commands, independently driving the at least one pixel within the single transparent membrane to set its opacity according to the degree of shading, wherein the degree of shading in each pixel element within the single transparent membrane is controlled by controlling percentage of light transmitted according to control commands issued by the programmable controller.

DESCRIPTION OF THE PREFERRED EMBODIMENTS

Figure 1A:
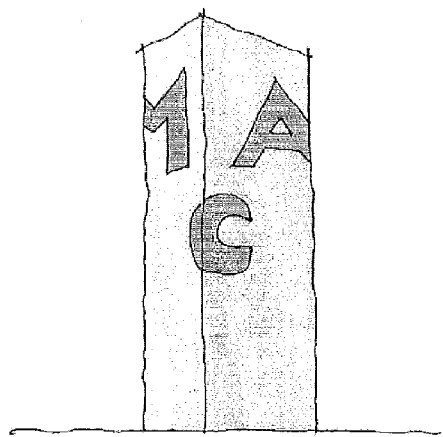
FIGS. 1a-d illustrate the present invention's four main applications within architecture.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

This invention focuses on applications to architecture, but the same device could be used in automobiles, marine vessels, aircrafts cameras, or any instrument that requires a selective and accurate regulation of light through a transparent membrane.

FIGS. 1a-d illustrates four main applications within architecture.

A) Large scale displays (see FIG. 1a). For example, this could be used for advertisement, or art installations.

Figure 1B:
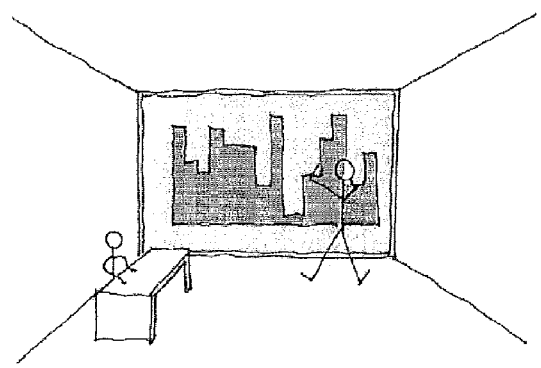

B) Small scale indoor displays (on room windows or other interior transparent membranes, or suspended sheets) (see FIG. 1b). For example shop windows could display information while allowing prospective customers to look through the window.

Figure 1C:
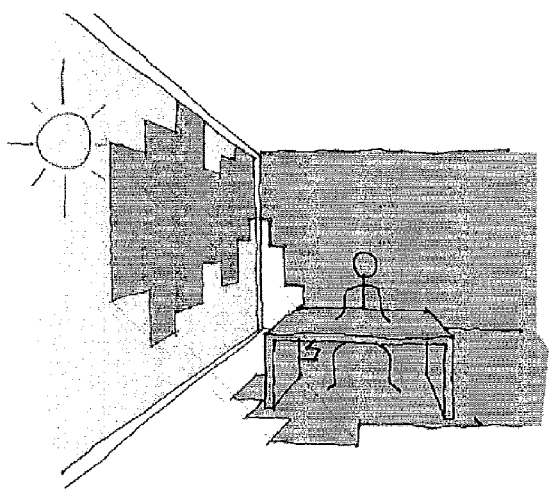

C) Glass facades that selectively block incoming sunlight and daylight for accurate environmental control (see FIG. 1c). For example, existing technology that allows tracking the sun's movement could be used for blocking only direct sunlight and letting scattered light enter the room freely, allowing maximum natural lighting with minimal glair.

Figure 1D:
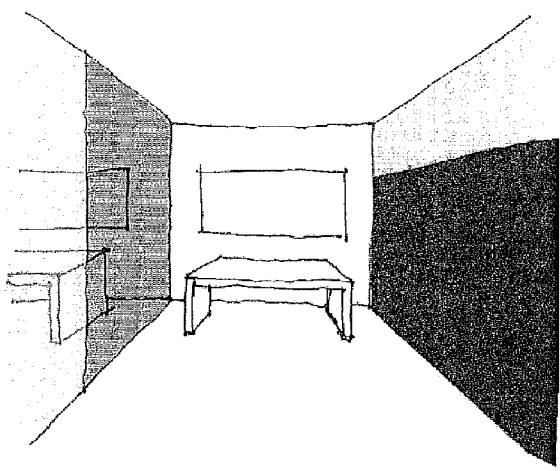

D) Modular visual partitioning of internal spaces could be achieved using transparent membranes as dividers (see FIG. 1d). For example one may divide a room into smaller partitions so that to block visibility from certain areas with the room. Such division will be dynamic as visibility could later be partially or fully enabled.

The input for all of the above applications could come from several sources. There could be a central control for an entire building that would provide image content to a large scale façade or an environmental control application. Images could be converted from a slowed down video, or any available digital image format, or they could come from a free hand drawing interface.

Figure 2:
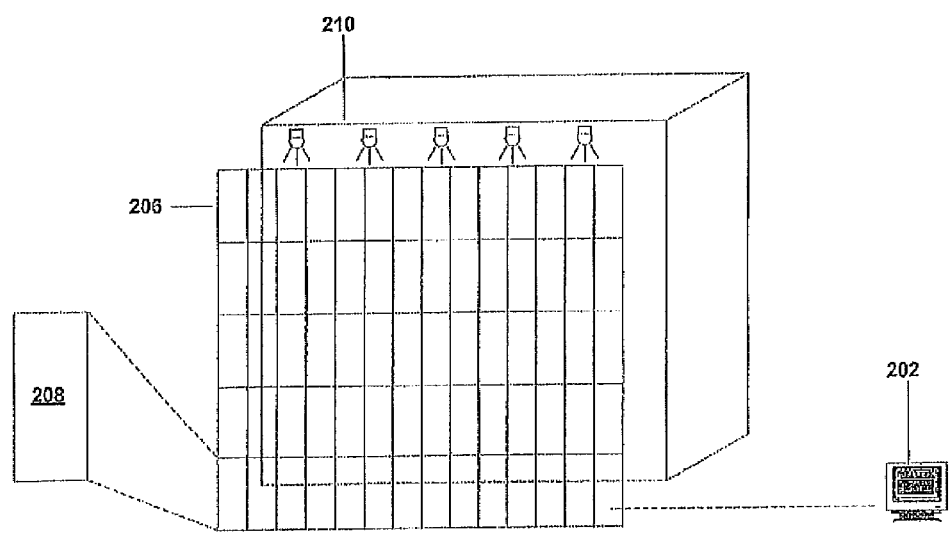
FIG. 2 illustrates window modules used in a building façade as per the teachings of the present invention.

In parallel, there could be a room scale control that would allow users to display their own graphics on the windows or partitions of their local space. Again, this could be a simple computer connection so that it would be used like any screen, or it could have a free hand drawing interface for displaying ideas and messages on the window, Methods of Incorporating it into the Building FIG. 2 illustrates the present invention's programmable facade 206 of window modules 208 that is used on top of a building facade 210. Window modules are designed in panels so that they will tile together when installed in a building similarly to standard glass panes, to form a large display (see FIG. 2). The associated electrical connections of each panel will connect rails that will guide the electrical signal from the controlling units (e.g., from the control computer 202).

To simplify installation, the controlling units need not reside next to the window. These units can be configured automatically to address a screen of a scale that is defined by the number of window modules that were connected to the conducting rails during installation.

For display purposes during the night, it will be necessary to illuminate the exterior envelope that conveys the desired information from inside the building (see FIG. 2).

Constructing the Window

There are several methods for constructing the window panel. Two main configurations exist, the choice between which is dictated by the desired method for controlling the pixels described below. The first is built to facilitate individual wiring of one terminal of each pixel, with a common ground to all. In the second, pixel terminals are connected together in common rows and columns.

To construct a window according to the first method, a transparent sheet (i.e. glass or plastic) is to be coated with a transparent conductor, where conductor distribution will determine the pixel shape and size. Each pixel is created by laying down a patch of transparent conductor: a square shape usually makes best use of the area of the sheet, and created the smoothest image. Each patch should then be individually wired with a transparent wire or a line of transparent conductor (see FIG. 20 and FIGS. 22-24 for non-limiting examples of windows that each have a plurality of pixels, wherein the wiring is done using a transparent wire or using a line of transparent conductor), and all wires from all patches should meet at one of the sheet's edges and connect to a terminal. Another transparent sheet should be entirely covered with transparent conductor and connect to a conducting wire which should in turn be connected to a terminal. A layer of suspended particles, electrochromic materials or liquid crystal is to be placed on the transparent conductor that is on the first sheet, and the second sheet should be pressed against the first, with the transparent conductor touching the suspended particles, electrochromic materials or liquid crystal. The two-sheet combination should then be laminated. The wire terminals of the first sheet are to be connected to the computer controller and the one from the second sheet to the ground.

To construct a window according to the second method, a transparent sheet (i.e. glass or plastic) is to be coated with a transparent conductor, where conductor distribution will determine the pixel shape and size. Each pixel is created by laying down a horizontal strip of transparent conductor, where the height of the strip defines the height of a rectangular pixel. Each strip should then be individually wired with a transparent wire or a line of transparent conductor and all wires from all patches should meet at one of the sheet's edges and connect to a terminal. Another transparent sheet should be coated with vertical strips of transparent conductor, where the width of the strip defines the width of a rectangular pixel. Each strip should then be individually wired with a transparent wire or a line of transparent conductor and all wires from all patches should meet at one of the sheet's edges and connect to a terminal. A layer of suspended particles, electrochromic materials or liquid crystal is to be placed on the transparent conductor that is on the first sheet, and the second sheet should be pressed against the first so that the transparent conductor strips are perpendicular to each other, with the transparent conductor touching the suspended particles, electrochromic materials or liquid crystal. The two-sheet combination should then be laminated. The wire terminals of both sheets are to be connected to the computer controller.

In order to develop the desired application it is necessary to use a material that can change the opacity of a transparent sheet and be electronically controlled. Several such materials exist, for example Suspended Particle Devices, Electrochromic Devices and Liquid Crystals. A test of these materials showed that, SPD is the best option for the intended product concept. When appropriately powered, SPD is advertised as having the lowest power consumption, it is easier to produce, operate and scale. The desired application was developed using SPD, but it could have been done with other materials such as the ones mentioned above, or with others that might be introduced in the future.

The Pixel Controller

First we should talk about the controller in an abstract manner, i.e. a device that allows the appropriate distribution of voltage to pixels across the sheet and takes commands from a computer or microcomputer. The command to the computer could be input by a variety of means, such as drawing boards, images, videos, sensors coupled with environmental optimization programs, and other time activation schemes.

The commercially available SPD film can be modeled as a capacitive load. The degree of transmittance (transparency) can be controlled by the amplitude of the AC voltage applied to the plates and the frequency at which this driving signal is applied.

First, the film needs to be driven with a low power but high voltage AC signal. Specifications from the manufacturer indicate operating amplitudes of 80 to 220 VAC and a frequency between 50 and 60 Hz. The high amplitude will necessitate an adequate power supply and conversion system. The AC voltage requirement means in addition that if we are to use a matrix structure to drive the display, we need to be able to both source and sink current from each of the independent row and column drivers.

The lower and upper bounds on the frequency of operation will also need to be considered, given the capacitive nature of SPD. At high frequencies, the low pass behavior will reduce the voltage amplitude appearing across the film. The low frequency bound on the other hand may dictate the feasibility of using multiplexed or refresh type techniques to drive the eventual prototype or may limit the number of pixels that can be controlled at a time.

The fact that the film is a bipolar load may complicate matters even more when attempting to use a common-cathode, common anode matrix display technique. Since induced current will be able to flow in both directions across the load, applying a voltage to one pixel in a matrix will possible affect the opacity of other pixels, because of undesired paths to ground. This problem is referred to as crosstalk or ghosting, and may cause several untargeted pixels to become activated.

The desire to drive each pixel at different opacity levels and not just in binary mode creates the need for an amplitude control switching phase, adding an extra burden to the total processing time per pixel. This feature is again important with regards to matrix or multiplexed type driving techniques. Other issues may result from the actual panel layout and bus wiring.

Figure 3:
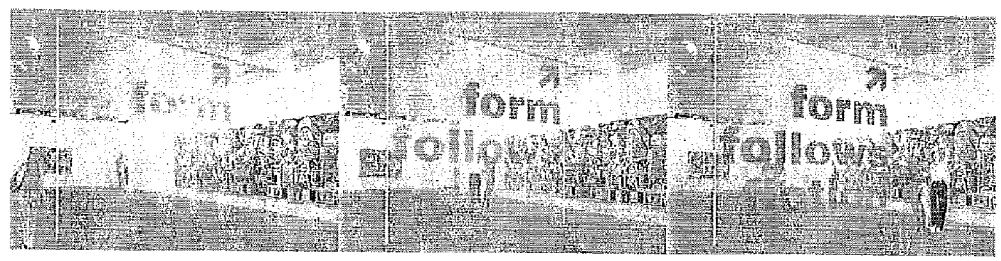
FIG. 3 illustrates a large-scale application developed based on the teachings of the present invention.

The present invention provides, in one example, the ability to control one hundred independent pixels, with the possibility of applying at least 64 voltage levels to each of them (1 byte of information)—a limitation that is neither taught nor suggested by the prior art. A basic implementation of the present invention is shown in FIG. 3.

Figure 4:
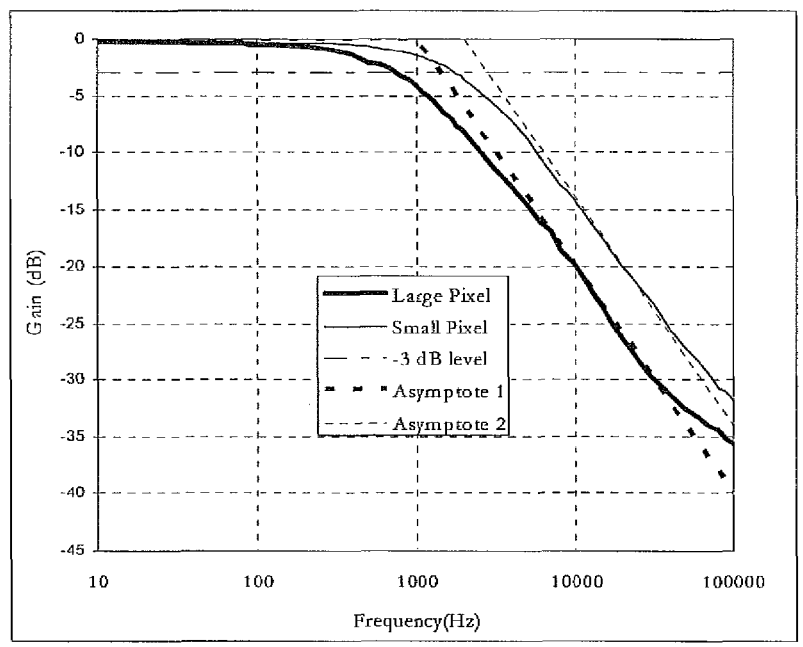
FIG. 4 illustrates the decibel (dB) gain responses for the two SPD pixel sizes in series with a 100 k resistor of 1% tolerance.

The SPD pixel is used in a low pass filter configuration, placing it in series with a resistor and the frequency response of the combined system is obtained. A 30 Volt peak-to-peak sine wave of a controlled frequency is applied across the resistor and pixel. The peak-to-peak pixel voltage is recorded as the output voltage and the gain is calculated as the quotient of output and applied voltages. FIG. 4 illustrates the decibel (dB) gain responses for the two SPD pixel sizes in series with a 100 k resistor of 1% tolerance. The best fits to ideal first order frequency response magnitudes are superimposed on the measured responses, as a means to check for the first order nature of the tested systems The ranges of capacitance for the both small and large pixels are about 0.7-0.9 and 1.4-1.8 nF respectively. This information can be used to start shaping the design of a driving system or circuit.

The fact that there is an Equivalent Series Resistance (ESR) (from wires, pins, transparent conductor, etc.) implies that only half of the energy supplied to charge a capacitor actually ends up stored on it, regardless of the size of this finite resistance. Since the stored energy is given by $\frac{1}{2} CV^2$, the total required energy is then $CV^2$. Power consumption will depend on how often the capacitor voltage needs to be charged or discharged, that is, on the frequency of the waveform applied to the pixel and so is given by equation (1) below:

$$P_{pixels} = C \times V^2 \times f \quad (1)$$

The film manufacturer specifies a range of recommended driving signals with amplitudes between 80-280 VRMS and frequencies between 50-1000 Hz and advertises a continuous power consumption of as low as 0.06 Watts per square foot (~0.65 W/m²). The matrix shown in table 1 below presents the estimated power consumption for each of the four combinations of extreme driving signal voltages and frequencies, obtained using the measured SPD pixel capacitances and the known pixel areas.

TABLE 1

Power consumption matrix for combinations of extreme driving signal voltage and frequencies. The tabulated values are in Watts/m.

| | | Frequency (Hz) | |
|---|---|---|---|
| | | 50 | 1000 |
| Voltage | 80 | 0.071 | 1.422 |
| (RMS) | 280 | 0.871 | 17.422 |

In the best case scenario, the calculated power consumption agrees to some level with the low values marketed by the supplier. For a frequency of 50 Hz and an 80 VRMS amplitude, for instance, the estimated consumption is of 70 mW. It is important to note that in order for the SPD to remain attractive from the power consumption perspective either driving frequency or voltage should be as low as possible. One would ideally want to use the film under the conditions of the top left corner of the matrix above. We come back to this issue later, when determining the optimal driving strategies for the system.

The degree of transparency is related to the strength and the duration of the alternating electric field between the two conducting plates and hence to the applied voltage. For purposes of controlling the opacity of a pixel, the notion of a linear transmittance or transparency range must be incorporated into the design, even though this variable is a non-linear function of applied voltage. The relation is linearized using a transformation function. That is, if specific percentage transmittance is required, the value is fed into this transformation function and the voltage which is expected to produce said transmittance is calculated.

$$\% \, \hat{T} = 40 \tan h(0.05(VRMS-20)) + 42 \quad (2)$$

The linearizing function (2) maps the desired transparency to the necessary voltage amplitude and it corresponds to the inverse of the best fit function:

$$VRMS_{required} = 20\left(\operatorname{arctanh}\left(\frac{\% \, T}{40}\right) - 42\right) + 20 \quad (3)$$

This transformation will be added to the control software, and will represent the last step before downloading commands to the actual switching system board.

Description of the Different Ways to Drive an SPD Pixel;

Given the electro-optical characteristics of the SPD film, there are several possible driving techniques that could facilitate the appropriate signal to drive the pixels. These are reviewed along with several possible switching topologies, and specifically that of a dual MOSFET totem pole.

The structure and associated behavior of the SPD film necessitate an alternating driving voltage for the control of the film's transparency. The first question to be asked therefore is how to produce an effective high voltage AC signal across the pixel. Fine control of the transparency levels is also part of the design concept, and it should be brought about by manipulating features of the applied HV signal. In addition the solution to the previous two problems must be extended to an array of pixels. What follows is an outline of feasible alternatives to tackle the stated problems.

When power dissipation and regulation are not pressing issues, the AC mains are a reasonably reliable source for a high voltage waveform. At 110-120 VRMS in the U.S. (~155-170 V amplitude), the mains provide an RMS voltage in the saturated region of the voltage vs. transparency relation presented in the previous section, at a marginal component overhead and with no need for voltage amplification. The major disadvantage arises from the lack of flexibility, since under this topology the drive frequency cannot be controlled.

Alternatively, a digital circuit could be used to produce a zero offset wave of more easily controllable parameters. A Digital to Analog (DAC)-based solution or frequency-mediated sine wave generator ICs could be used for such task (see publication to Philip Krein titled "Elements of Power Electronics"). In either case, these solutions would entail an amplification stage to be able to reach the high voltages needed for operating the SPD pixels at maximum transparency levels.

Another option to recreate AC drive signals across pixels is to use DC-AC conversion by effectively sampling from HV DC power rails, and alternating the polarity of the connections to the pixel terminals. The HV levels could be obtained readily by rectifying the mains AC signals. This solution stands out for its versatility, as more of the signal parameters can be varied and their effects analyzed.

The load characterization clearly depicts the capacitive behavior of the SPD pixel. The effective voltage across a capacitor in any form of RC circuit depends on a fixed DC gain and the frequency of the wave being input to the system. Being transparency a function of RMS pixel voltage, varying gain and/or drive frequency are the most straightforward strategies for transparency control.

Clearly, by changing the effective amplitude of the input signal, the electric field strength and hence the transparency level are directly controlled. However, given the inherent series resistance (be it from wires, the pixel conductive layers or from an external resistor), the low-pass nature of the pixel—resistance aggregate system yields yet another method to control the transparency, taking advantage primarily of the attenuation of pixel/capacitor voltages at high frequencies.

For either the direct AC wave drive or the sampled DC drive direct amplitude control would require a variable gain or amplification stage. Under the HV AC alternative direct amplitude control requires a variable low voltage AC wave generator followed by a HV amplification stage, possibly a transformer. The amplitude of the low voltage AC signal, and consequently of the amplified output wave, can be easily and digitally controlled using a digital to analog converter or a digital potentiometer.

The major issue is clearly the amplification stage. A survey of components in the HV niche yielded a line of high voltage operational amplifiers by APEX semiconductors, the major disadvantage being the extremely elevated cost, barring this alternative from the space of feasible solutions.

High-voltage adjustable regulators could also be an interesting option. The Texas Instruments TL783 (see Texas Instruments Datasheet of TL783), with an adjustable output range of 2-125V is perhaps a suitable choice. Although the in-depth discussion is deferred for later, the maximum voltage constraint will probably limit its use for strobed or multiplexed systems. That is, if one single HV rail is to be used, the driving strategy will necessitate some form of strobing or multiplexing. When this is the case, in order to apply an effective voltage of over 100 VRMS, the applied samples or pulses must be high enough to average up the periods in which other pixels are being serviced. Having the maximum value capped at 125 V may represent a problem in this context.

It is also possible to resort to high voltage transistors and develop an application-specific HV variable supply, which would certainly relax the minimum limit on the HV level. Several basic design alternatives are briefly introduced in the publication to Paul Horowitz titled "The Art of Electronics." The design of such supply, essentially an operational amplifier, would require feedback analysis to produce a fast slew-rate and response and be able to switch the amplification level quickly between when pixels are being serviced. The determining step would be the characterization of the gate-signal to output-signal frequency response of the switching element, to be able to close a control loop around the level converting stage. Although also applicable to the fixed DC rail alternative, the overall cost, now in terms of time, deems this option equally undesirable.

In theory, however, it is also possible to have a series of discrete and fixed DC voltage rails, switching the desired voltage onto the required pixel. This option would only be practical up to a certain number of discrete voltage levels, a greater range demanding considerable component overhead—basically one switch per voltage level. This additional complexity would add to that of the switching or driving devices. What is more, given the wide range of voltages that produce distinct transparency, more than just a few discrete tones or voltage settings will be necessary. Since the response appears monotonic at least before the evident plateau, to maximize the pixel's information content the control levels should be as many as possible.

The main advantage of resorting to a frequency dependent control mechanism is that only a single non-adjustable voltage level is required. This technique takes advantage of the low-pass behavior of the wire-pixel system. Since both the wire resistance and the measured and verified effective capacitance of the pixel are insignificant, however, the RC time constant of the system will be extremely low, giving it an enormous −3dB bandwidth—with C at 2 nF and a wire resistance of about less than 1 Ohm this number is at around 5 GHz! Consequently amplitude control would have to be brought about using signals far into the HF spectrum unless a large resistance is added to the driver output. Although possible, such high frequency switching may be hard to implement without taking the design complexity to another level.

Most dimmer-switches resort to phase control to regulate the amount of current being sourced into a load. A bi-directional pass element, usually a thyristor and more precisely a TRIAC, blocks the current path at a certain phase angle (time from the zero crossing) of the AC wave. The longer the blocked portion of the AC wave, the lower the apparent intensity of the bulb. In the case of a resistive load (bulb), across which voltage changes instantly, visual perception represents the low-pass filtering stage.

The phase angle is usually adjusted using a potentiometer between the signal (mains) line and the TRIAC gate (current drive). Digital Control could be incorporated by having the high voltage AC wave, feeding a clipped version through a zero crossing detector circuit and use an interrupt initiated process to control the amount of time to leave the TRIAC pass element in the on state. The driving of the TRIAC could be performed with high current drivers.

The DC analog of phase control is Pulse Width Modulation (PWM), which essentially uses constant voltage pulses of varying width to control or vary an effective applied voltage. If the on-off switching or pulsing is done fast enough, the net effect is an average voltage given by the product of the pulse voltage and the duty cycle. In this context, pulse width modulation (PWM) effectively provides a means to control the RMS voltage and indirectly the transparency of the SPD pixel.

PWM depends on the accurate manipulation of the switching waveform (e.g. when varying pulse widths precisely), this usually not being a problem at the logic level. To setup a PWM strategy at the voltage levels required to drive the SPD film, on the other hand, the driver must be composed of fast switching components. This requirement points in the direction of the MOSFET. The main advantage of such a switching solution is the minimal design overhead in terms of power electronics, since there is no need for the pixel drivers to have complicated high-voltage adjustable supplies or bulky transformer stages (except to provide metallic isolation). PWM just requires a stable HV rail, easily obtainable from the isolation and rectification of the AC mains waveform and an appropriate gating component to source current from it.

The many alternatives discussed so far tackle the problem of driving an AC wave onto the SPD pixel. The number of feasible solutions changes when this type of drive is extended to a matrix arrangement of such pixels, as would be the case with a display. Although TRIALS might be adequate for strobing successive phases of a HVAC wave, the display constraint still pushes towards a MOSFET-based solution on the grounds of component size, high switching speeds and practically full control of the effective cross-pixel applied wave (see publication to Paul Scherz titled "Practical Electronics for Inventors").

High-voltage rails and switching elements is probably the optimal design to drive the pixel in terms of flexibility. With the MOSFET solution, frequency, pulse width and also polarity can be digitally controlled, a useful capability to have in the early test stages of a prototype.

Displays usually resort to some form of multiplexed or strobed driving technique, where the switching times are one of the main constraints on the size of the display. This is particularly the case when the voltages to be switched are considerably high due to the need for high slew rates.

The main idea behind a level converter system is to have two pass elements, to source and sink current to and from a load. A MOSFET half-bridge configuration does precisely that. When arranged in a totem pole or half-bridge topology, combinations of N and P channel MOSFETS can be used to source and sink current from positive and negative HV rails, to provide a path to ground, or to appear as a hi-impedance output. The conversion from digital logic to over 100 Volts, more precisely the gating of the HV power MOSFET, calls for special drive considerations.

In a totem pole setting, two MOSFETS are connected in series and used as either source or sink device with the appropriate control logic. If two N-Channel type devices are used in a source-drain alignment, the top MOSFET's source terminal actually floats on the half-bridge output. The device cannot be gated with a voltage referenced to ground, since the conductive state is reached when its gate-to-source voltage reaches a threshold.

A thorough discussion on the issue of high-side or floating drive is presented in the publication to International Rectifier titled "An-937 Gate Drive Characteristics and Requirements for HEXFET Power MOSFETS" and several plausible design routes are recommended. Among these, and presented here for its simplicity, is the bootstrap capacitor method for high and low side driving of a dual N-channel MOSFET half-bridge.

Figure 5:
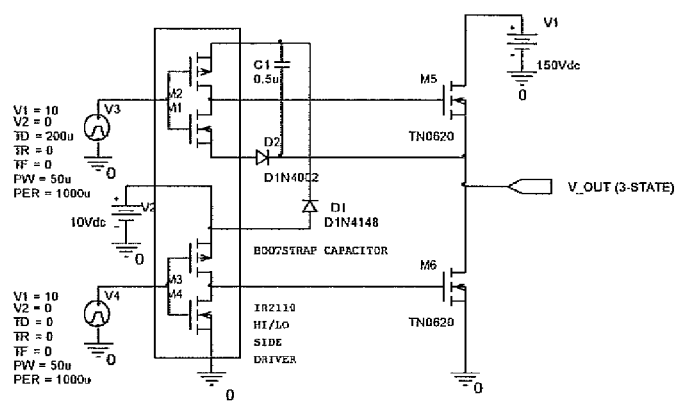
FIG. 5 illustrates a basic dual N-channel half-bridge driver using a bootstrap method for high-side gating.

FIG. 5 illustrates a basic dual N-channel half-bridge driver using a bootstrap method for high-side gating.

The high side gating occurs when capacitor C1 charges through the fast recovery D1N4148 diode as the low side power driver sinks current from the output node. When the low side power MOSFET stops conducting, the capacitor is effectively holding an above threshold gate to source voltage that floats on the output, just like the source of N-Channel MOSFET. In order to source a high voltage, therefore, the high side driver input signal must be low and the low-side input must be high. The maximum pulse width is dictated by how well the bootstrap capacitor maintains its voltage.

Figure 6:
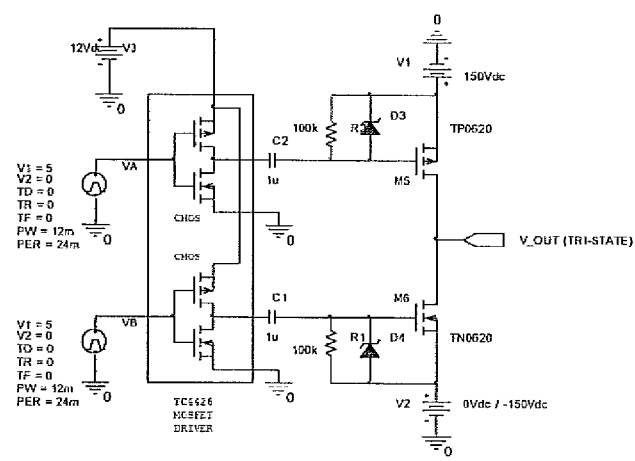
FIG. 6 illustrates a CMOS half-bridge driver using a simple RC gate drive.

Additionally, one could also just choose to use a common drain CMOS half-bridge, with the advantage of being able to reference the high-side gating of the PMOS to the HV rail and the low-side NMOS to the opposite supply. The basic driver topology for this alternative is illustrated in FIG. 6.

In this driver circuit, the high-side P-Channel MOSFETS are gated by the voltage temporarily appearing in the source-gate resistor as the voltage at the base of the RC circuit changes. Assume, for instance, that the system starts in steady state. The gate capacitor is charged to +HV or 150 Vdc in this case. When the MOSFET driver's output goes high, the gate will actually be at a higher level than the PMOS source until the capacitor discharges. When the MOSFET driver output goes low again, the capacitor now charged to less than +HV will actually trigger the top PMOS. The maximum width of the applied pulse is controlled by playing with the RC time constant.

Perhaps the only difference between the two presented driver designs is the ability of the RC gated drivers to supply both +HV and -HV pulsing. Again in the interest of adaptability, versatility and simplicity, this driver is selected for the support test platform.

An objective was to build a system that grants enough freedom and power to vary the many possible features of the signal applied to an SPD pixel. The basic discrete element system is built around the half-bridge MOSFET drivers described earlier. Each N and P channel CMOS pair has an associated level conversion stage, allowing the gating of the high-side MOSFET and a power driving chip interfacing it to the digital logic control circuitry. The operation of the control logic, the timing and program flow are controlled in software using the micro-controller unit.

The selected microprocessor, the ATTIny26, is part of the RISC architecture microcontroller family by ATMEL. Among the main on-chip features are multiple function I/O ports, an on-board ADC, timers and an external interrupt. The chip offers 2 KByte flash memory space for program download, 128 Bytes of EEPROM and can be clocked internally to run at 16 MHz with no additional components.

The main operational functionality and the first level of design abstraction are brought about by a simple C function called update_latch. The function takes in a COLUMN, a ROW, a PHASE flag and a PULSE WIDTH parameter and proceeds to turn on the drivers corresponding to the pixel at the row and column intersection accordingly.

This sections reviews ways to apply variable voltage AC signal to the pixels:

In general driving circuits for display technologies are classified into two broad categories, direct driving and multiplexing. The load characteristic dictates which category the display system will fall into.

Under direct drive, each pixel's signal electrode has its own circuit driver and is electrified independently of the other pixels, but at the same time. The anode or ground electrodes are usually tied together. There is therefore a continuous application of power and since no periodical refreshing is required the system is also referred to as static driving.

This addressing method is perhaps both the simplest and most robust. For instance, a failure in one driver element would only affect a single pixel, whereas in the case of matrix or multiplexed addressing, it would affect a whole column, row or concurrent group of pixels. In addition a close connection between pixel and driver allows for easy implementation of a compensation or feedback system to stabilize the pixel output against component performance loss (see thesis by Eko Lisuwandi submitted to M.I.T. in 2003 titled "Feedback Circuit for Organic LED Active-Matrix Display Drivers").

In spite of these advantages however, the lack of scalability limits direct addressing to very low information content displays. For a small array of pixel, the easiest way to switch a variable high voltage signal to each SPD pixel would be to assign each a high-voltage source and a control or switching totem-pole driving element. For a 100 pixel system, however, this technique would translate into more than two hundred discrete components, a problem both in terms of cost and bulkiness. If n is the number of pixels under static driving, the complexity, component use and cost of the system grow linearly with n.

For purposes of the intended application, continuous application of signals to each pixel is not efficient in terms of power consumption as well as controller size. On top of the systematic desire for low power systems lies the issue of the large-scale feature of this display application. The main rationale for the use of SPDs in this application is their trivial power requirements. If their use were to be extended to very large surfaces one would want to keep the consumption as low as possible for such an application to remain attractive.

Although it would definitely minimize both control lines and drivers, the main reason to resort to some form of strobing is therefore to reduce power consumption. By way of illustration, take a 100 pixel display, each pixel being one of the 9 cm a side squares characterized previously. The theoretical power consumed by one such pixel when a V volt 0-offset square wave is applied to it is of $\sim CV^2$. When using direct drive, all 100 pixels are using said amount of power. If, on the other hand, the driving circuit were charging one pixel at any one time then the required power would be just 1% of the previous total. In ideal terms, single-pixel strobing could therefore allow one to drive 10,000 pixels with the same power consumption used to direct drive 100 pixels. As a matter of fact, the actual power consumption would have to include the gate and output capacitances of the driving elements and the power usage of control circuits, but the figure would still be much lower than under concurrent drive.

A discussion of multiplexed driving strategies; strobing an AC wave onto an SPD pixel:

The alternative of multiplexed drive stands as possible solution to the scalability and power consumption considerations of this particular application, at the expense of some robustness and operational simplicity. The display is set up as a matrix structure with common anode rows and common cathode columns each assigned an independent gating element. In square displays, the complexity and component use now grow as the root of the total number of pixels.

The benefits of multiplexed drive in terms of the amount of signals or drivers that must be controlled are evident. For a 100 pixel display, we would be talking about a 90 gating component difference with respect to AC direct drive. The implementation of multiplexed drive requires, nonetheless, thorough consideration of the load response characteristics. The need for fast switching necessitates faster pixel responses as well as an extremely precise switching control.

In traditional multiplexed drive, gating elements are located peripherally, opening up a path from signal (source) to ground (sink) across a component connecting a column and a row bus. In active matrix technology however, signals control a gating element, typically MOSFET switches, which are connected in series with the load. One set of lines carries the voltage signal to be applied to the pixel device, and the other set controls the on-pixel gating. Active matrix driving therefore still requires one gating component per pixel, but it makes use of multiplexed control and power signals to reach each of them. That is, there are savings with regards to control lines but not to the required number of drivers.

SPD film has no state memory and consequently has to experience a continuous voltage waveform of specific amplitude across its terminals in order to remain transparent. Its response, specifically its turn-off time, is therefore particularly important in establishing whether a refresh system could be used to drive it. It is seen that although steady state transparency levels do follow the amplitude of the applied voltage, the voltage rise times and decay times are much faster than those of the transparency variable.

When dealing with SPDs in which organic particles are suspended between two conductive parallel plates there exists a time-constant related to the changes in the cross terminal voltage. A second time constant is associated to how fast random motion disorganizes the particles in the suspension when there are changes in the AC-field, and it is quite likely related to variables such as the suspension viscosity, or any other variable affecting the diffusivity of the organic particles.

In the context of displays, and precisely of strobing or pulsing strategies, the slow dynamic behavior of this transparency variable is of great advantage. It implies that once the transparency is obtained, it takes but a simple update pulse at a certain cutoff frequency to maintain that state. In this qualitative analysis the scaling of the photodiode output is not an issue. Independent of the vertical scaling, the time evolution provides a great insight into the speed of the transparency decay times.

The rise times in transparency are faster than the fall times. Whereas in the rising transparency stage an electric field is forcing the alignment, on the falling transition only random motion causes the disordering of particles. The rising time constant is of about 500-600 ms and the decay time constant of about 3 seconds.

As mentioned before, the slow decay times may be advantageous from the multiplexed drive standpoint, since they provide some leeway on the required pixel update frequency. Transparency does start changing immediately after the drive voltage is removed. Intuitively, the lack of signal just after the oscillatory pulse stops implies that the average voltage applied per unit of time is reducing slowly with time. Transparency follows the reduced average voltage and drops accordingly.

A key issue here is to make sure that the servicing frequency together with the applied signal voltage, give an average applied voltage that will drive the transparency level to the required level in the first place. The transparency variable is still a function of steady state or average voltage after all and, although the decay will be slow, the pixel will lose transparency if the average voltage applied to it decreases.

The control system will allocate each pixel in the display a specific service time. During this time, the signal properties will have to be adjusted to produce the effective AC drive and the required transparency levels. A series of alternative approaches to tackling these two issues are exemplified in the next section.

Matrix addressing guarantees that all pixels are independently reachable either with fewer components (passive) or just fewer control signals (active), but a more complex system needs to be built around it to be able to display an image that requires several pixels to exhibit different opacity levels concurrently.

In light of the AC signal operation of SPD, successive services to each pixel would have to be of opposite polarity, a requirement that adds to the complexity of the problem. The following discussion presents an overview of different strategies to multiplex AC signals onto an SPD pixel using the MOSFET based test platform. Each driver can provide three states, HI, LO or high-Z.

This technique handles strobes by phases, first handling the positive phases for all pixels and then their negative phases. During the non-servicing time, the drivers are set to high-impedance or floating state.

Since the pixel is left floating during the non-serviced period, it remains charged. Because even a small pulse charges the output voltage to the max rail value, the effective amplitude cannot be controlled by varying the pulse width during the service time. The alternative is to ground both pixel terminals after the required pulse width has been applied, discharging the capacitor voltage before floating its terminals and causing the desired effect on the transparency. Note that the pixel transparency, as evident from the photo-detector output, remains at the same level as before which confirms there is not need to leave the cross-pixel voltage charged between services.

The service time for this strategy is constrained by the minimum required driving frequency for SPD film of 50 Hz. At 50 Hz, the half period is of 10 ms. For a 100 pixel display, each pixel would be assigned only a 100 μs servicing time. The issue here is, as was explained earlier, that the required operating voltage will have to be adjusted to make sure that the effective RMS or average voltage can actually cause the maximum transparency level.

Figure 7A:
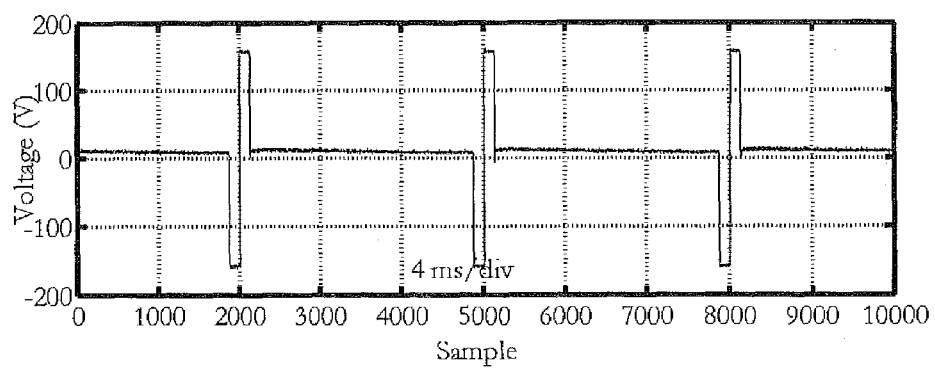
FIGS. 7a-b illustrate bi-polar pulsing of transparency variable.
Figure 7B:
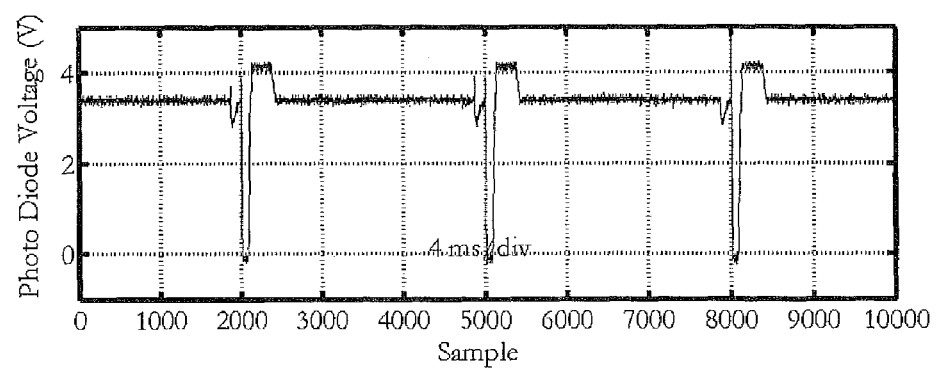

A third alternative is the application of a bipolar pulse. FIGS. 7a-b illustrate bi-polar pulsing of transparency variable. Under this strategy, the pixel is completely serviced during its allotted time and it in theory gives the transparency variable a pulse-like kick. As long as the frequency of the +/− pulse is within the specified SPD limits, the servicing rate must be constrained by the perceptual fusion frequency (~10-20 Hz) and the actual RMS average voltage the pixel sees. If we would like to keep the HV rail at a reasonable level (i.e. below ~300 VRMS maximum rating of the SPD), the maximum duty cycle that could be used to attain the full transparency (reached with 60 VRMS) would be off about 60/300 or about 20%. That is, only five pixels would be able to be serviced before restarting.

Figure 8A:
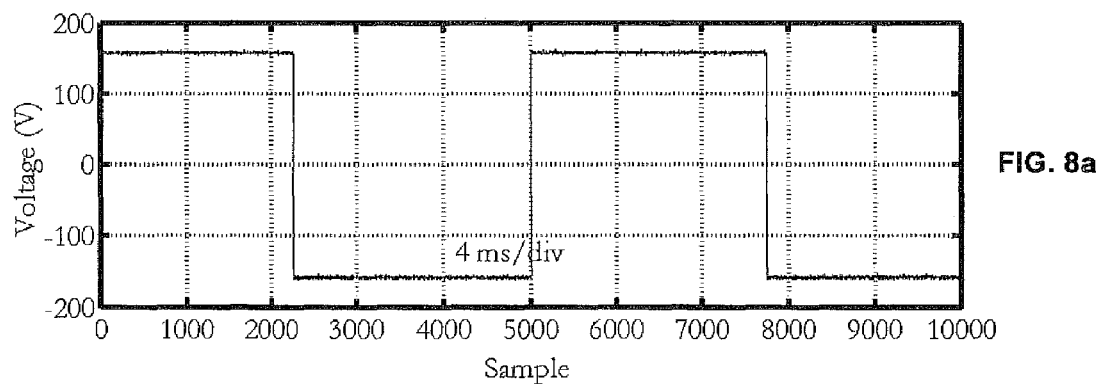
FIGS. 8a-b illustrate transparency variable with continuous drive under an equivalent voltage level and frequency.
Figure 8B:
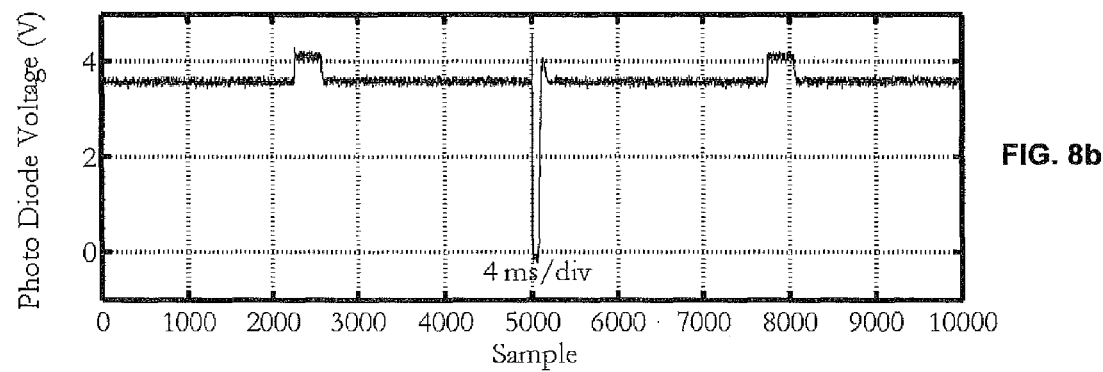

As a final note, the equivalent plot is presented for continuous drive at the same corresponding frequency. FIGS. 8a-b illustrate transparency level with continuous drive under an equivalent voltage level and frequency. The photo-detector voltage is at the same level as in the previous cases, showing that a pulsing strategy can produce the same transparency level as continuous drive at this particular refresh frequency range of about 100 Hz.

There are several design strategies to reduce the voltage required for strobing a display. The first is to resort to a modular design. Instead of using a 100 pixel unit, for instance, four 25 pixel modules could be used and interconnected. The strobing would now go only through 25 pixels on every refresh, increasing the effective signal's duty cycle. In light of the safe 20% on-off duty cycle calculated earlier, strobing across 25 pixels may also limit the maximum transparency. Fortunately, considerable improvements can also be attained by resorting to a multi-line strobing technique within each of the modules.

Multi-Line Addressing lies between the extremes of direct drive and single-pixel strobing. Instead of multiplexing over every pixel, a column of the display array is handled at any one time. At the start of the column service, the untargeted columns drivers are set to a Hi-Z or floating state. The row drivers are set or cleared depending on which pixel in the column needs to be activated. Amplitude control is handled by leaving the corresponding row driver on for whatever duty cycle is associated to the desired transparency. After one phase is completed, the driven column reverses polarity and the rows are activated as required to apply the reverse polarity voltage for the specified duty cycle.

Figure 9A:
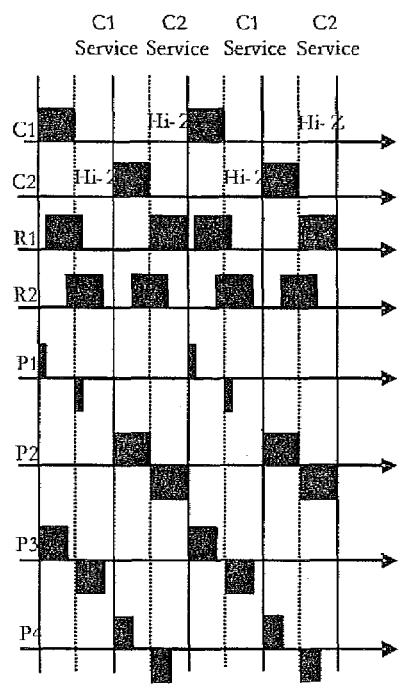
FIG. 9a illustrates the multi-line strobing strategy for a 2 by 2 pixel array.

FIG. 9a above shows the required COL and ROW drive waveforms to produce different transparency levels in a 2 by 2 sample pixel array using MLA. The signal P1 applied to pixel 1 is controlled by the on/off time of the row one (R1) waveform when column one (C1) is being asserted. The proper functioning of the MLA driving technique requires column drives to be able to produce a Hi-Z state when inactive. This would prevent the constantly running rows waveforms form affecting pixels in untargeted columns.

Figure 9B:
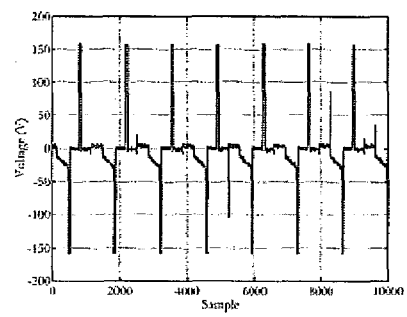
FIG. 9b illustrates an ideal waveform applied to P1.
Figure 9C:
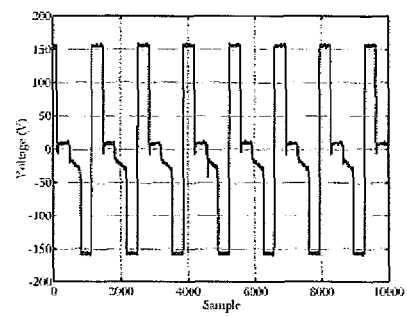
FIG. 9c illustrates an ideal waveform applied to P2.

FIG. 9b illustrates an ideal waveform applied to P1. FIG. 9c illustrates an ideal waveform applied to P2.

We choose multi-row (i.e. one column at a time) by way of illustration but the truth is one could go as far as fill scale-direct matrix addressing if power dissipation or consumption levels allowed for it. The decision to use multi-line addressing resulted from trying to find a midpoint between power consumption constrain (high bound) and the transparency response minimum RMS input voltage (low bound).

The driving strategies reviewed thus far all require 3-state drivers at least for the column lines, as is the case with MLA. The tested platform provided this feature and this should be a requirement of any driving integrated circuit to be used for a final prototype.

In implementing the multi-line driving strategy in a pixel array, a passive matrix wiring topology would represent the easiest way to strobe signals onto it. Given that SPD film is a bidirectional conductive element, however, this type of addressing is very sensitive to the problem of crosstalk, that is, to the activation of unwanted pixels due to the common-cathode common anode wiring. This problem is referred to as cross-talk or ghosting, and may cause several undesired pixels to become activated (see publication to Ohta et al. titled "Electronic Display Devices").

Consider a 2 by 2 matrix. To electrify the top-right pixel a voltage must be applied by asserting row 1 and column 1. If the two other lines are left floating the desired pixel sees +V across it, while untargeted pixels 2, 3 and 4 split up the +V volts across them and this is the result of pixel P4 being able to conduct in both directions.

Figure 10A:
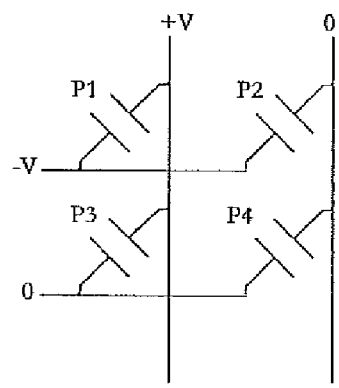
FIGS. 10a-b illustrate passive matrix addressing and cross-talk.
Figure 10B:
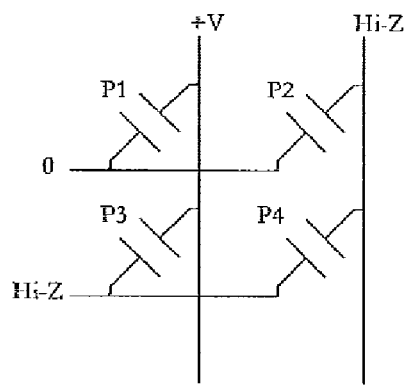

To minimize crosstalk the unused rows and columns are sometimes grounded and the signal on the target pixel is applied using bipolar drivers (as shown in FIG. 10(a)). As seen in FIGS. 10a-b, when column one is set to +V and row 1 to −V, P1 sees 2V across it, P2 sees −V, P3 sees +V and P4 experiences no crosstalk. Ghosting occurs in both cases, although affecting a different set of non-targeted pixels. If the driven load had a response threshold set anywhere below V/3 or V/2 volts, any of the two alternatives proposed above would work, since untargeted pixels would be able to see up to V/3 or V/2 volts across them and still not be active.

Figure 11:
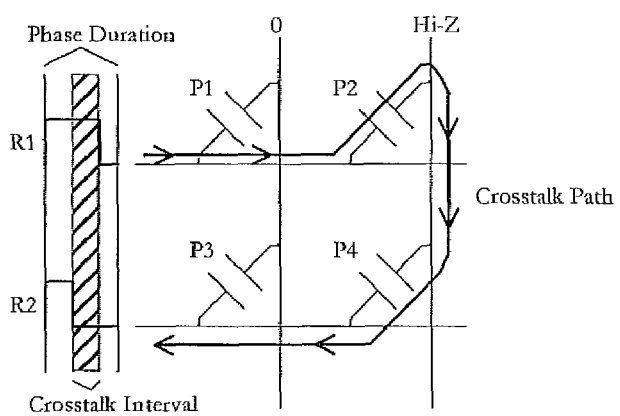
FIG. 11 illustrates crosstalk during multi-line addressing, occurring when row pixels are assigned different pulse widths.
Figure 12A:
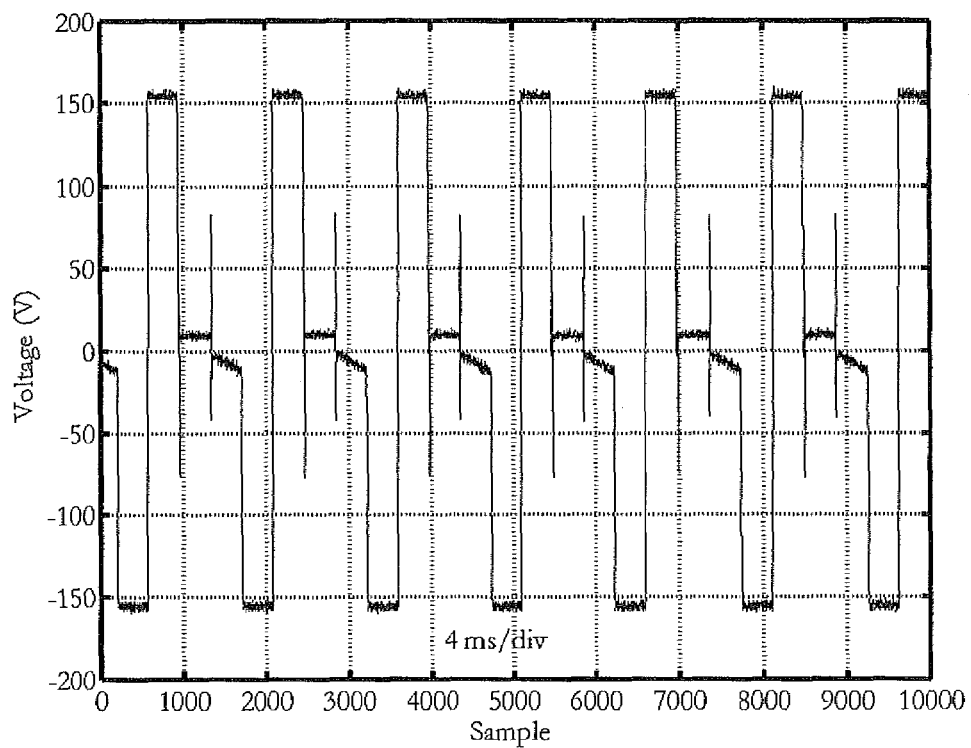
FIGS. 12a-b illustrate multi-line addressing and cross-talk.
Figure 12B:
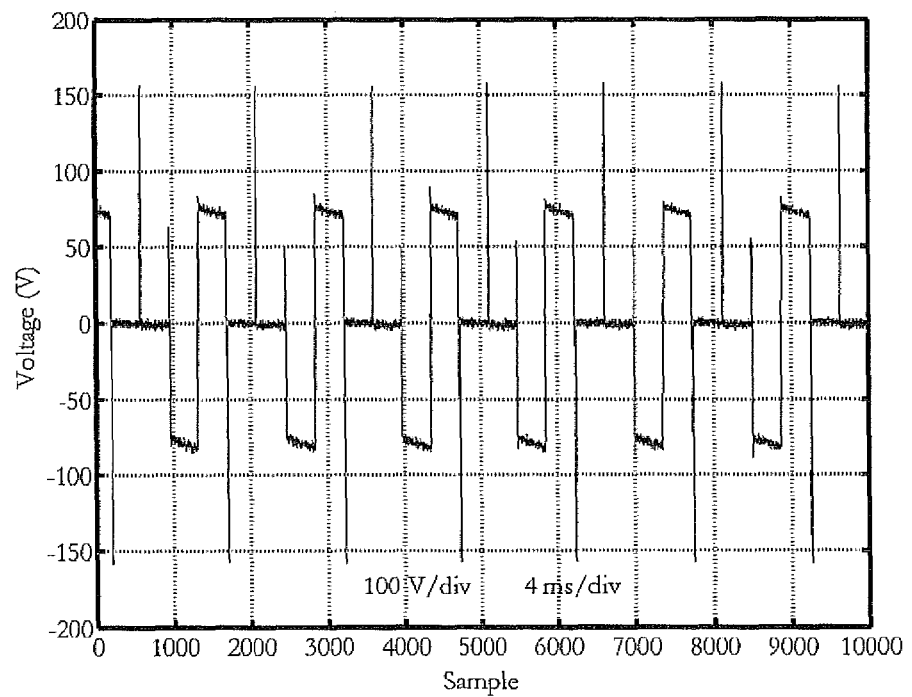

A review of the cross-pixel signals provides a clearer understanding of what happens. The voltage across the untargeted top-row pixels is about half the one applied to the targeted pixel. FIG. 11 illustrates crosstalk during multi-line addressing, occurring when row pixels are assigned different pulse widths. FIGS. 12a-b illustrate multi-line addressing and cross-talk. Under multi-line addressing cross-talk occurs whenever two pixels in the active column are being applied different pulse widths. When the pixel in row one is still ON but the pixel in row two is grounded, current can flow from row 1 (still on) to row 2 (grounded) across pixels 3 and 4.

The two untargeted pixels thus split the voltage between them, as clearly evident in the next plots, which show the target and non-target pixel waveforms at the maximum difference in pulse width between the row 1 and row 2 signals. As expected, during each phase (half-period) the two pixels on the unasserted column split the applied voltage, causing each to see half the amplitude.

Figure 13:
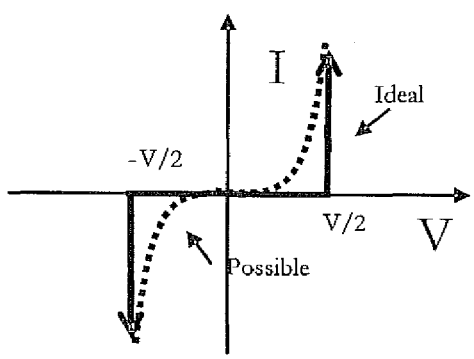
FIG. 13 illustrates an ideal response of the SPD pixel to be able to driven without passive addressing.

Crosstalk results from SPD film not having an activation threshold. If this were the case, passive matrix addressing would still be an option. This motivates an attempt to tackle the problem by looking for ways to artificially recreate a threshold on the response of the SPD pixel. Ideally, the I-V characteristic response is as shown in FIG. 13.

Figure 14:
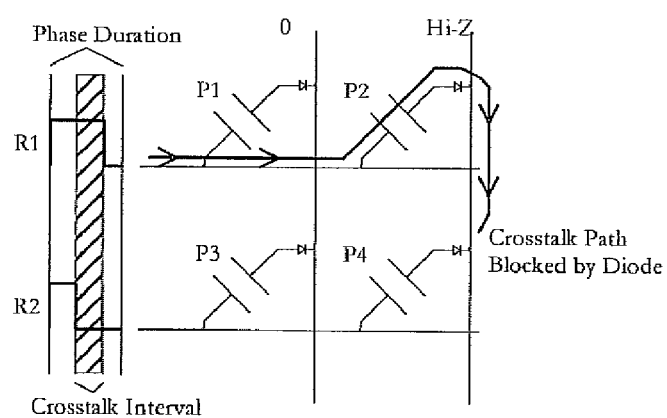
FIG. 14 illustrates an anti-crosstalk strategy using unidirectional drive and reverse conduction blocking diodes.

Under such a threshold, the pixel load would conduct bi-directionally but only when a high enough voltage is applied. If we use HV Pulse Width Modulation (PWM) for amplitude control this threshold would just have to be below the HV rail being sampled. Passive matrix wiring would be used and the activation cutoffs would block the half voltages that would otherwise affect untargeted pixels. FIG. 14 illustrates a diode-based solution to impose the desired V-I response curve. A pair of Zener diodes in series with the load conduction path and connected in opposing polarities could provide a fair approximation. This arrangement would actually be reproducing the effect of a TRIAC bi-directional switch.

Instead of imposing HV threshold, the crosstalk problem might also be tackled by eliminating the bidirectional conduction requirement of the SPD drive signal and utilizing blocking diodes. This strategy would preclude the use of a bipolar AC wave to drive the pixel and should in theory make no difference since, from the pixel perspective, all that matters for the alignment-induced transparency is the presence of an alternating E-field.

The response of the Zeners and diodes in general is not ideal. The V-I characteristics are more along the lines of the dotted curve in FIG. 13, with a small leakage current existing well before the diode forward or Zener reverse voltages are reached. Given the extremely low RC time constant of the pixel-wire system, even such small leakage currents would suffice to charge the pixel to noticeable voltages even when the diodes have not been activated (i.e. when it is not supposed to charge). The artificial threshold solutions would work in resistive loads (on which trivial currents also have trivial effects) but not on small capacitive loads as the SPD pixel.

Another alternative approach to incorporate a threshold might resort to frequency modulation alternatives. Although the capacitance of the pixels is very small, the ultimate variable of interest has a much larger time constant. High frequency drive could be used against crosstalk, taking advantage of the roll-off (i.e. threshold) in the low-pass filter frequency response. The targeted pixel could be driven by an intersection of a constant I-IV level and a high frequency wave causing the net voltage to be at a highly attenuated frequency.

If the anti-crosstalk strategies discussed earlier were to be implemented, the current SPD film with which this research was carried out would require there to be a discrete component in series with every pixel. In an attempt to minimize the sacrificed pixel area each of the pixels would have to be reached independently and the blocking or threshold-imposing components would have to be wired in series in a remote location away from the actual panels.

That is, the artificial addition of a threshold would require the panel of pixels to be directly driven or wired anyway. This being the case, we could add full-control of the threshold characteristics by placing a HV driver at one end of every pixel. Given our AC drive constraint, a totem pole driving common cathode would have to be used at the other end of the pixels. This topology would actually be implementing an AC form of active addressing, since one side of the pixels are reached by rows and the other one by columns, each of the column pixels having an independent driver.

With regards to the required pixel wiring, MLA could be thought of as implementing a strobing technique in a directly addressed panel. This approach reconciles the threshold advantages of direct drive—adding control over the threshold via a switch—with the power consumption savings associated to a pulsed or time-multiplexed activation. Permitted by the low information content of our basic controllable model, direct-driven MLA was shown to work perfectly on a test with the 2 by 2 pixel array.

Figure 15A:
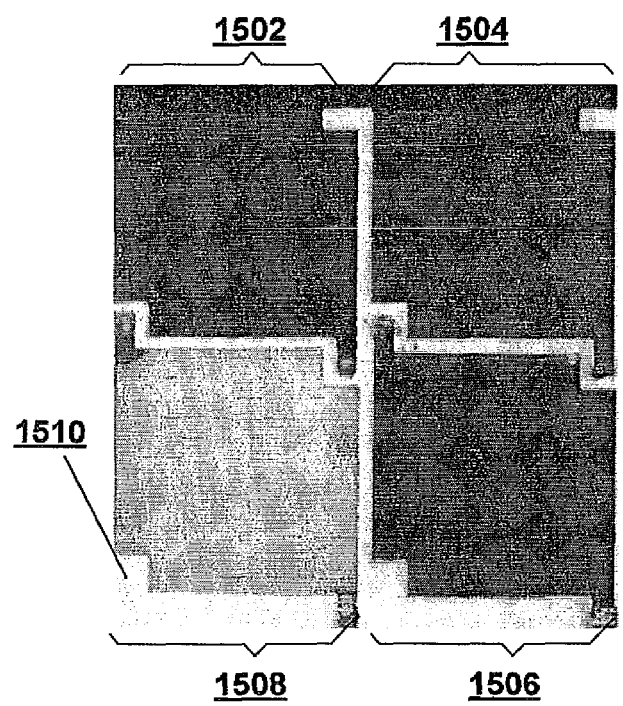
FIGS. 15a-b illustrate image analysis to study relative pixel brightness under direct addressing and MLA strobing.
Figure 15B:
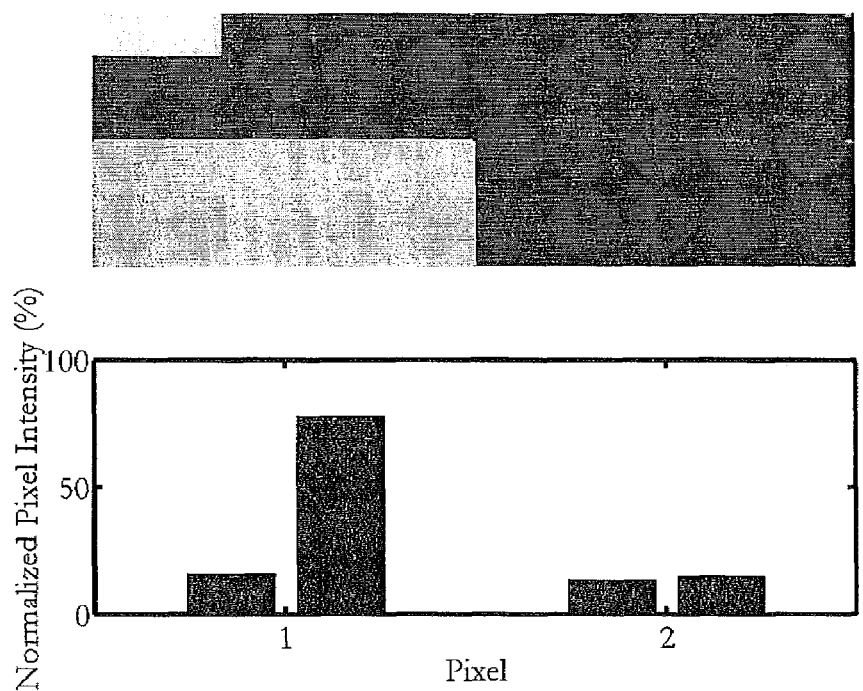
Figure 16A:
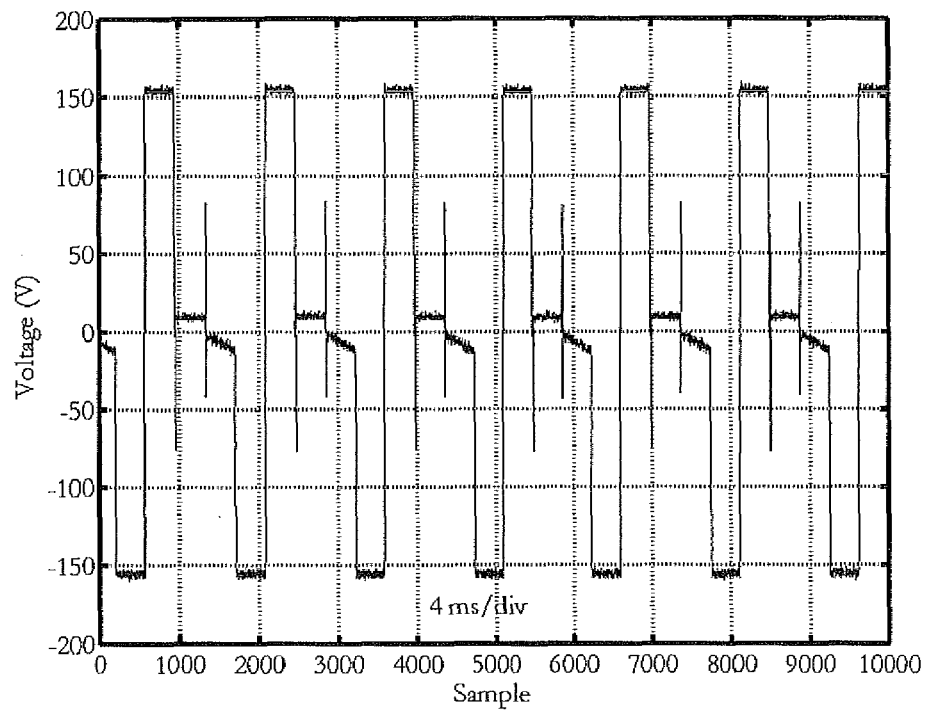
FIGS. 16a-b illustrate active and inactive pixels under direct-addressing and MLA strobing.
Figure 16B:
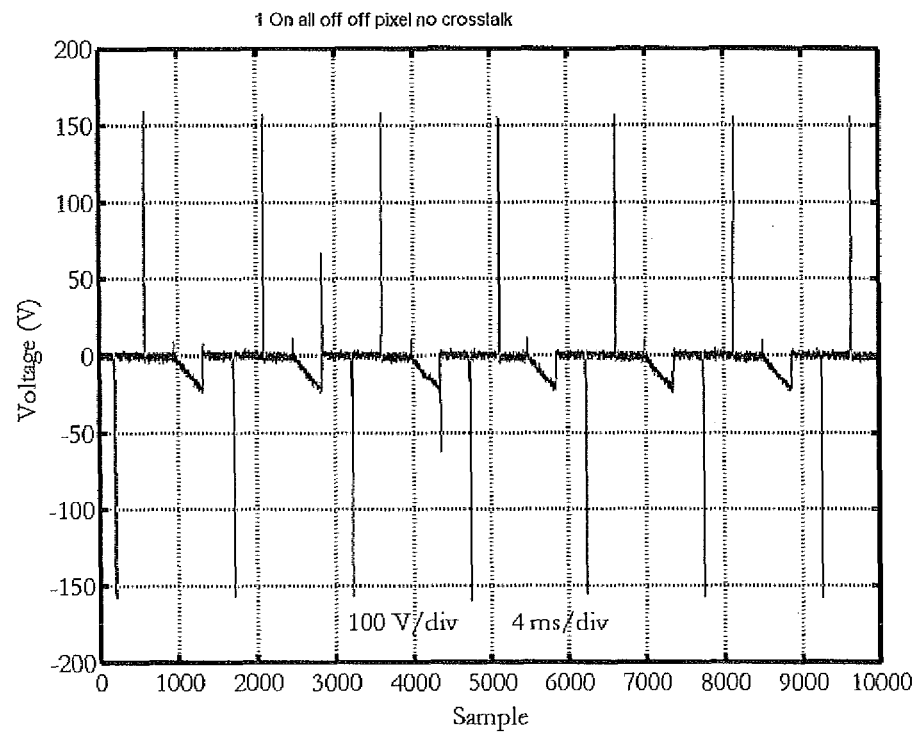

FIGS. 15a-b illustrate pixel brightness under direct addressing and MLA strobing. FIG. 15a illustrates a setup comprising four pixels, 1502, 1504, 1506, and 1508, formed on a single transparent membrane 1510, wherein only targeted pixels (i.e., pixels 1502, 1504, and 1506) are on. FIG. 15a-b shows that there to be absolutely no cross-talk when using MLA under direct drive. FIG. 15b illustrates the results confirmed after digital image analysis. The waveforms measured across the target and not-target pixels under the current solution are illustrated in FIGS. 16a-b.

A prototype, introducing key design and engineering elements, could be drawn from in future versions of this system. In an attempt to refine the design and reduce the peripheral control box sizes, the prototype resorts to off-the-shelf or commercially available High-Voltage integrated circuits and, with a clear set of design considerations, works around the constraints imposed by their operational ratings.

Supertex products were chosen for the system due to their ability to operate at voltages of up to 250 V. For a 25 pixel module using multi-line addressing, for instance, the voltage needs to be cranked up in order to make the pulse-triggered transparency level equal to that obtained from continuous drive.

Figure 17:
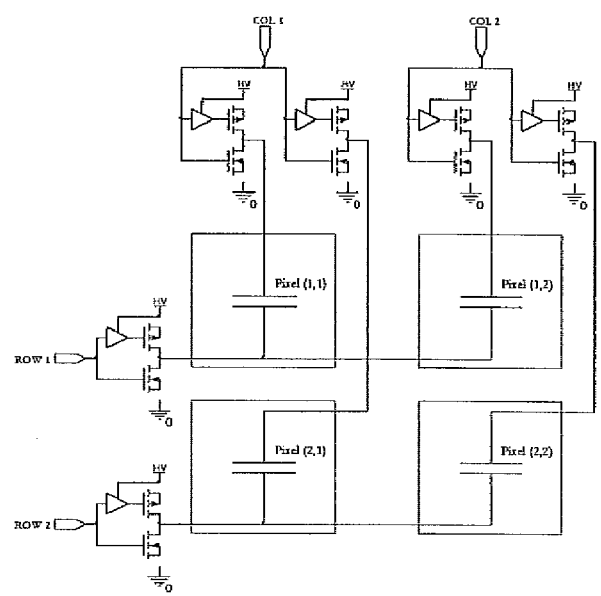
FIG. 17 illustrates a 2 by 2 section depicting the active matrix AC-drive wiring topology, wherein the column drivers are themselves composed of independent drivers for each pixel in the column.

In one example, the final prototype consists of four interconnected 25-pixel modules. These modules are driven using a multi-line addressing strategy and, given the low pixel resolution per module, an active-matrix wiring topology is chosen to make sure cross-talk is avoided. FIG. 17 illustrates a 2 by 2 pixel representation of the wiring and driving scheme applied to the basic window module. Note that each column driver consists actually of drivers for each of the pixels. They all share a common activation signal but there is common source drive only along the row or horizontal direction.

Effectively still in a matrix topology, this design takes advantage of the multiplexed or pulsed drive associated to matrix structures and at the same time uses a pseudo-direct drive wiring methodology.

The implementation of MLA requires column drivers capable of sourcing and sinking current, as well as being at high impedance (Hi-Z) state. The best fit is a combination of the HV7022 and the HV514. Both ICs are serial to HV parallel converters, the former controlling 34 3-state drivers and the latter driving only 8 HV lines to either HV or ground. The operation of these devices is based around a low-voltage shift register into which data can be clocked, and a latch line that causes the values in the shift register to act upon the high voltage outputs.

Each chip has a distinct mechanism to control the state of its HV drivers. For purposes of this design, the two important control lines in the HV7022 are the polarity (POL) and the output enable (OE). With other control lines grounded, the state of the output driver is dictated by the POL, OE line and the shift register (SR) state as dictated by table 2 below.

TABLE 2

Truth table for the control of the HV7022 outputs [Supertex Data Sheet].

| SR | POL | OE | OUT |
|----|-----|----|----|
| H | H | H | H |
| L | H | H | Hi-Z |
| H | L | H | L |
| L | H | H | Hi-Z |
| X | X | L | All Hi-Z |

The case of the HV 514 is straightforward. The latch enable (LE) line must be low when data is being clocked into the device. When LE is set, the serial register contents are amplified and presented in a transparent manner at the outputs. The only minor issue with regards to the HV7022 chip is the lack of a proper latch enable line. The equivalent control is an output enable (OE) line. When OE is low all outputs are in Hi-Z state so every time a data packet is updated the columns drivers will be floating.

The main feature of serial registers as those used to load data onto these HV drivers is that they have both Data In and Data Out pins. That is, if several such devices are daisy chained (DO→DI and so on . . . ) one can eventually think of the system as a giant shift register. The controlling of the output states would in this case be dictated by the serial packet to be clocked into the devices. The switching system is designed with this idea in mind.

Figure 18:
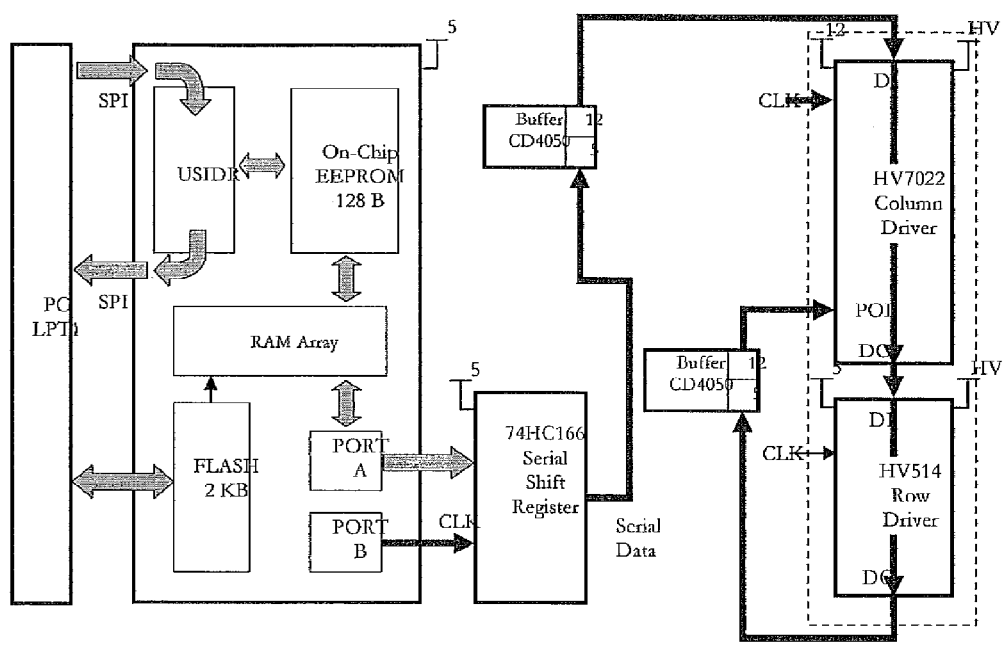
FIG. 18 illustrates a block diagram of elements and features of the switching circuit box.

The basic features and capabilities of the switchboard system are presented in the block diagram in FIG. 18.

The board contains an MCU for interfacing to a higher level control system and to perform the low-level timing and routing. The serial transfer chain is composed of the HC166 parallel to serial converter, the HV7022 column drivers and the 514 row driver. The serial packet consists of 6 bytes containing the states of all 25 column drivers, 5 row drivers and a polarity control variable. The position of these control bytes within the serial packet is indicated in table 3.

Figure 19:
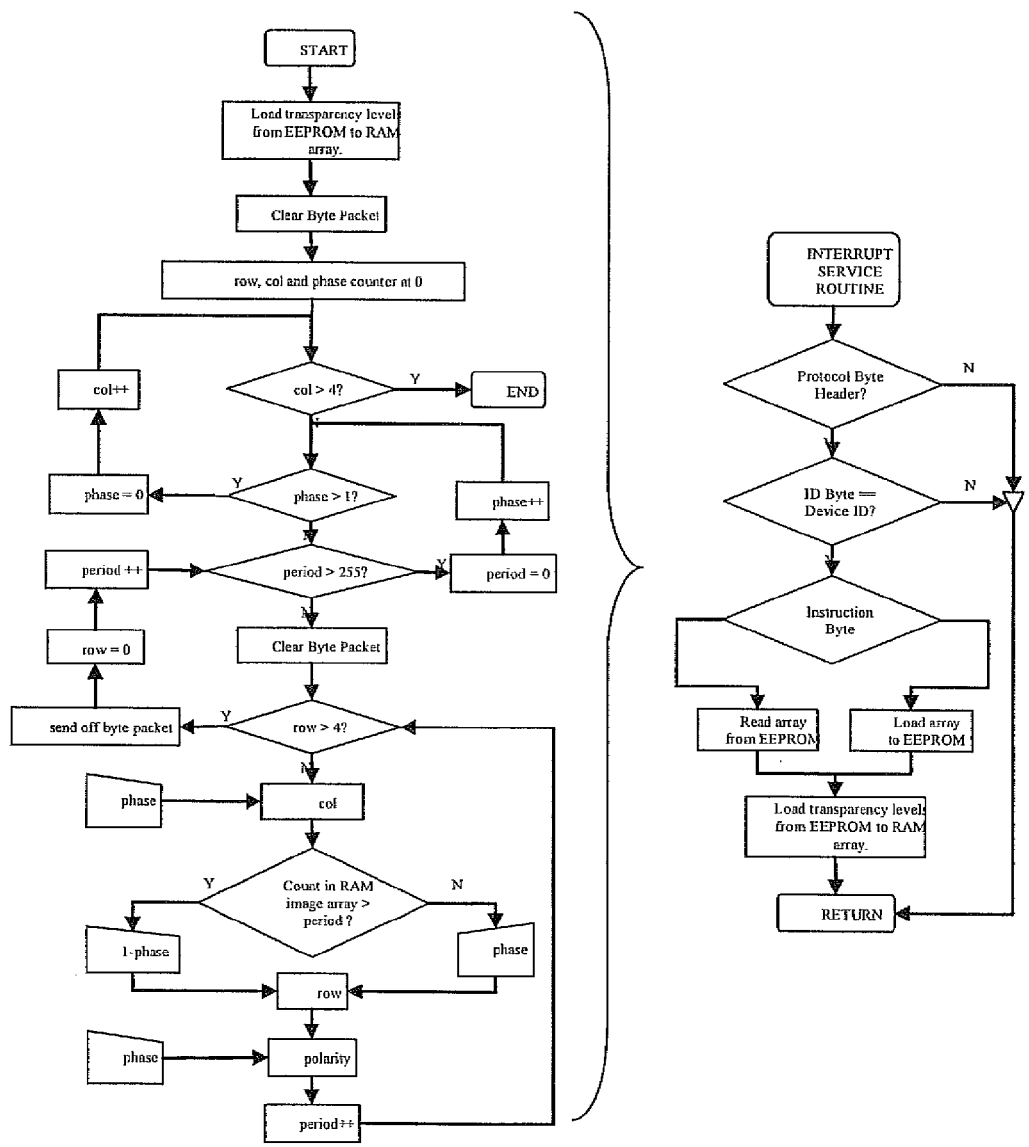
FIG. 19 illustrates a simple control software algorithm implementing MLA on the peripheral switchbox.

FIG. 19 illustrates a simple control software algorithm implementing MLA on peripheral switchbox. The flow control program keeps a track of the following states: COLUMN, ROW, PHASE and PERIOD. On every period increment the program checks the current value against the corresponding value in a 5 by 5 byte array, essentially the image. The byte packet will then be updated as required and will then be clocked out onto the system.

The packet is composed of 6 bytes, with bits within the packet assigned to specific drivers or functions along the aggregate shift register. The state of the program, dictated by the current COL, ROW, PHASE and PERIOD value, and the image array values control whether the byte array must be updated before each download. The multi-line switching algorithm is handled by the MCU and the high-level flowchart implementation is presented in FIG. 19.

The serial packet is sent out in byte batches with the use of the 74HC166 parallel to serial converter. The MCU presents the byte on PORTA and then latches it onto the converter. Immediately after, 8 pulses, (16 edges) are sent out to clock all the daisy chained components and the byte shifts into the first 8 slots of the aggregate register. Note that the connection from PORTA to the parallel input port of the converter should be inverted to make sure that the least significant bit of the least significant byte in the serial packet is the first to be clocked in (the one that will get all the way to DO of the HV514 chip). The process is repeated for the remaining 5 bytes of the packet.

When the desired linear transparency is calculated, as a percentage of total transparency, this value is transformed into the required PWM duty cycle that will produce the requested transmittance. This value is then downloaded onto the switchboard. The linearization process is carried out on the computer side. Two methods are feasible, one having a lookup table of previously calculated values and the second one calling the approximate conversion function obtained previously on every download. Either of these could be used depending on any constraints on program length vs. running speed.

Given the size requirements, a small microprocessor is used and this puts pressure on the availability of control lines. The required control lines are the OE/LE, the CLK, the Parallel Load signal for the HC166 parallel to serial converter and the POLARITY line for the HV7022. After the requirements for communication and programming link, only three of the PORT B lines are available.

Instead of adding extra components, the control over the extra line is incorporated as a signal bit within the communication/download protocol. By making this bit the first important bit position in the serial data stream, it will always end up in the data out pin of the HV514, the last to chip on the serial chain. The DO pin could be used to drive any control signal. In this case, the POLARITY state of the HV7022, the control line dictating whether the outputs will transition between H or L and Hi-Z, is tied to the DO pin. The stream of data must be perfectly coordinated such that at the time the OE and LE signals are asserted, the 514 DO line will be presenting the corresponding polarity value. The value of the POLARITY bit in the serial packet is dictated by the PHASE state in the software.

The table provided below (table 3) shows the serial register and byte packet protocol.

TABLE 3

Serial register and byte packet protocol.

| Aggregate Shift Register Bit | Driver Outputs | Column and Row Byte/Bit Location | Serial Packet Bytes |
|---|---|---|---|
| 0 | 7022  HV 1 | 4 | 7 |
| 1 | HV 2 | 3 | 6 |

TABLE 3-continued

Serial register and byte packet protocol.

| Aggregate Shift Register Bit | Driver Outputs | Column and Row Byte/Bit Location | | Serial Packet Bytes | |
|---|---|---|---|---|---|
| 2  | HV 3  | COLUMN 0 | 2 |       | 5 |
| 3  | HV 4  |          | 1 | BYTE  | 4 |
| 4  | HV 5  |          | 0 | 5     | 3 |
| 5  | HV 6  |          | 4 |       | 2 |
| 6  | HV 7  |          | 3 |       | 1 |
| 7  | HV 8  | COLUMN 1 | 2 |       | 0 |
| 8  | HV 9  |          | 1 |       | 7 |
| 9  | HV 10 |          | 0 |       | 6 |
| 10 | HV 11 |          | 4 |       | 5 |
| 11 | HV 12 |          | 3 | BYTE  | 4 |
| 12 | HV 13 | COLUMN 2 | 2 | 4     | 3 |
| 13 | HV 14 |          | 1 |       | 2 |
| 14 | HV 15 |          | 0 |       | 1 |
| 15 | HV 16 |          | 4 |       | 0 |
| 16 | HV 17 |          | 3 |       | 7 |
| 17 | HV 18 | COLUMN 3 | 2 |       | 6 |
| 18 | HV 19 |          | 1 |       | 5 |
| 19 | HV 20 |          | 0 | BYTE  | 4 |
| 20 | HV 21 |          | 4 | 3     | 3 |
| 21 | HV 22 |          | 3 |       | 2 |
| 22 | HV 23 | COLUMN 4 | 2 |       | 1 |
| 23 | HV 24 |          | 1 |       | 0 |
| 24 | HV 25 |          | 0 |       | 7 |
| 25 | HV 26 |          | 4 |       | 6 |
| 26 | HV 27 |          | 3 |       | 5 |
| 27 | HV 28 | COLUMN 5 | 2 | BYTE  | 4 |
| 28 | HV 29 |          | 1 | 2     | 3 |
| 29 | HV 30 |          | 0 |       | 2 |
| 30 | HV 31 |          |   |       | 1 |
| 31 | HV 32 |          |   |       | 0 |
| 32 | HV 33 |          |   |       | 7 |
| 33 | HV 34 |          |   |       | 6 |
| 34 | 514 HV 1 |      |   | 5     | 5 |
| 35 | HV 2  |          |   | BYTE  | 4 |
| 36 | HV 3  | ROW 4    |   | 1     | 3 |
| 37 | HV 4  | ROW 3    |   |       | 2 |
| 38 | HV 5  | ROW 2    |   |       | 1 |
| 39 | HV 6  | ROW 1    |   |       | 0 |
| 40 | HV 7  | ROW 0    |   |       | 7 |
| 41 | HV 8  |          |   |       | 6 |
| 42 |       | POLARITY |   |       | 5 |
| 43 |       |          |   | BYTE  | 4 |
| 44 |       |          |   | 0     | 3 |
| 45 |       |          |   |       | 2 |
| 46 |       |          |   |       | 1 |
| 47 |       |          |   |       | 0 |

The driver integrated circuits have maximum power dissipation ratings that constrain the number of drivers that can be set at any one time. For the HV7022 the absolute maximum rating is of 1200 mW. The power consumption calculation includes two main components. On one hand is the power required to gate the high-voltage CMOS drivers. The HV7022 datasheet indicates that a single high-voltage output draws 4 mA from the supply rail.

The MLA drive technique requires the concurrent driving of five HV outputs, each of which is activated at most 20% of the time. The remaining 80% of the time this group of five drivers is in Hi-Z state, waiting for the assertion of the other four columns. The power consumption to gate any set of five drivers is therefore given by:

$$P_{drive} = V \times I \times n_{drivers} \times \text{DutyCycle} = 150 \times 0.004 \times 5 \times 0.2 = 600 \text{ mW} \quad (4)$$

On top off the 0.6 W needed to drive the HV outputs is the extra power dissipated when charging the five SPD pixels that could be activated simultaneously. For an operating voltage of 150V and a pixel capacitance of ~1.8 nF, the required power amounts to:

$$P_{pixels} = C \times V^2 \times \text{DutyCycle} \times n_{pixels} = 1.8 \times 10^{-9} \times 150^2 \times 0.2 \times 5 = 0.4 \text{ mW} \quad (5)$$

The total power consumption for this MLA implementation hence comes out to ~600 mW, most of which is used by the driving circuitry. This value is below the recommended maximum absolute rating of the HV driver IC.

The hardware control system, in particular the microprocessor unit is equipped with a UART-like serial special function shift register. 3-line serial communication capabilities allow information to be loaded to this special function register using the MOST, MISO and CLK special pins on PORTB.

The particular implementation, a Serial Peripheral Interface (SPI) based communication link, is part of a standard set of protocols used. It suffices to indicate that the link asserts information on the ATTiny26 serial interface register. Once the desired information is clocked onto the SERIAL register (USISR), a latch signal is triggered. The latch signal is tied to the external interrupt INT0 pin (PORTB,6) which is configured in software accordingly. When the program handles the interrupt request, the incoming data can be read directly from the USISR variable and loaded into the on-board EEPROM.

The advantage of using the AVR's SPI capabilities is that the chip can be both programmed and talked to via a parallel port, using 5V signals an requiring no level conversion components as would be the case with RS-232 serial communication. The second advantage is that the communication is handled entirely within the External Interrupt Service routine associated to external interrupt 0. This means that the system can be programmed while it is running, without having to reset the images being switched onto the displayed. When the required instruction is just a READ STATE from the EEPROM or the current state array, the interruption time causes no discernible glitches on the image being displayed.

Figure 20:
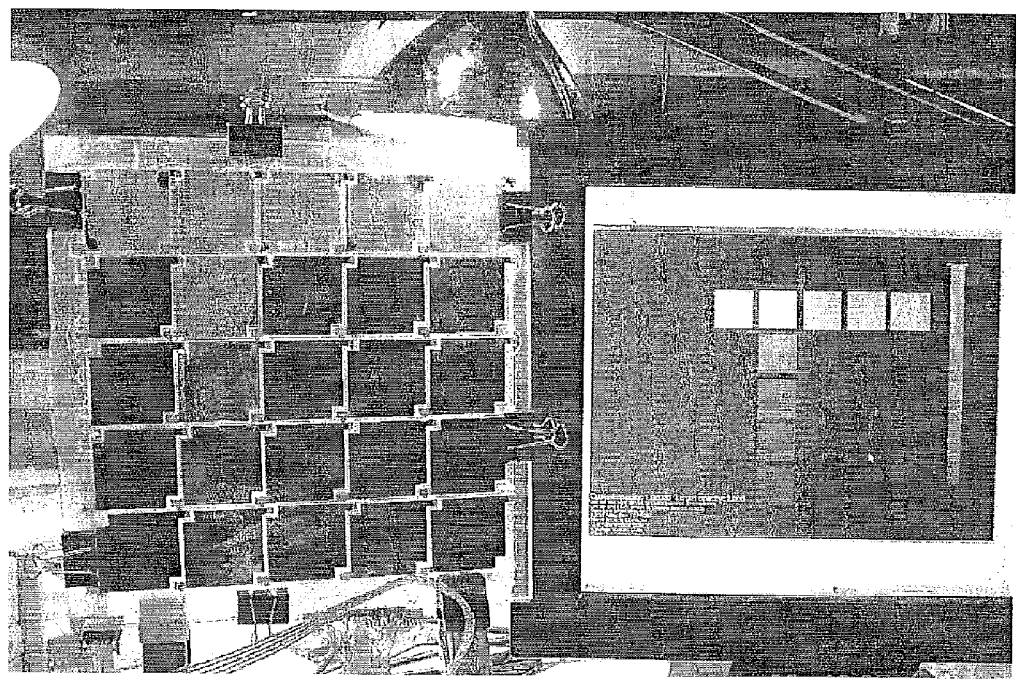
FIG. 20 illustrates an initial prototype having 25 modules.

FIG. 20 illustrates an example prototype having 25 pixel module used in conjunction with a simple graphical user interface (GUI). It should be noted that the pixel is displaying the exact tone gradient on the GUI.

Figure 21:
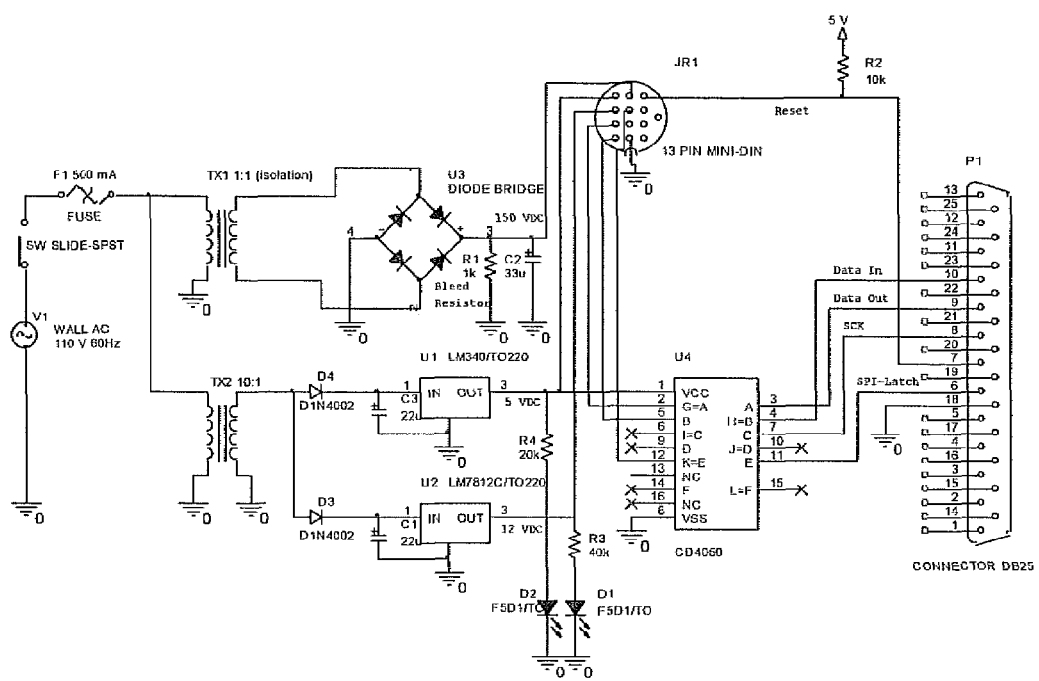
FIG. 21 illustrates the circuit schematic for the prototype power supply and routing box.

FIG. 21 illustrates a schematic circuit diagram of the power supply and routing box used in conjunction with the present invention. The four module prototype is powered from a single power board. The board is connected to the mains AC lines and contains two transformers, one for HV metallic isolation and one to step down the HV AC waveform to produce a ~20 V AC wave which is then rectified and fed through 12 V and 5 V voltage regulators. The isolated HV AC wave of approximately 156V amplitude is rectified using a power diode bridge and the rectified output is connected to a 33 u electrolytic capacitor. A bleed resistor is placed in parallel to the capacitor, allowing it to discharge when the system is off.

The power board also contains the parallel port connector. The communication signals are buffered and then directed to the 13-Pin Mini Din connector that will hook the board up with the actual display panels. The three power rails, HV, +12V and +5V are also routed to the connector.

Figure 22:
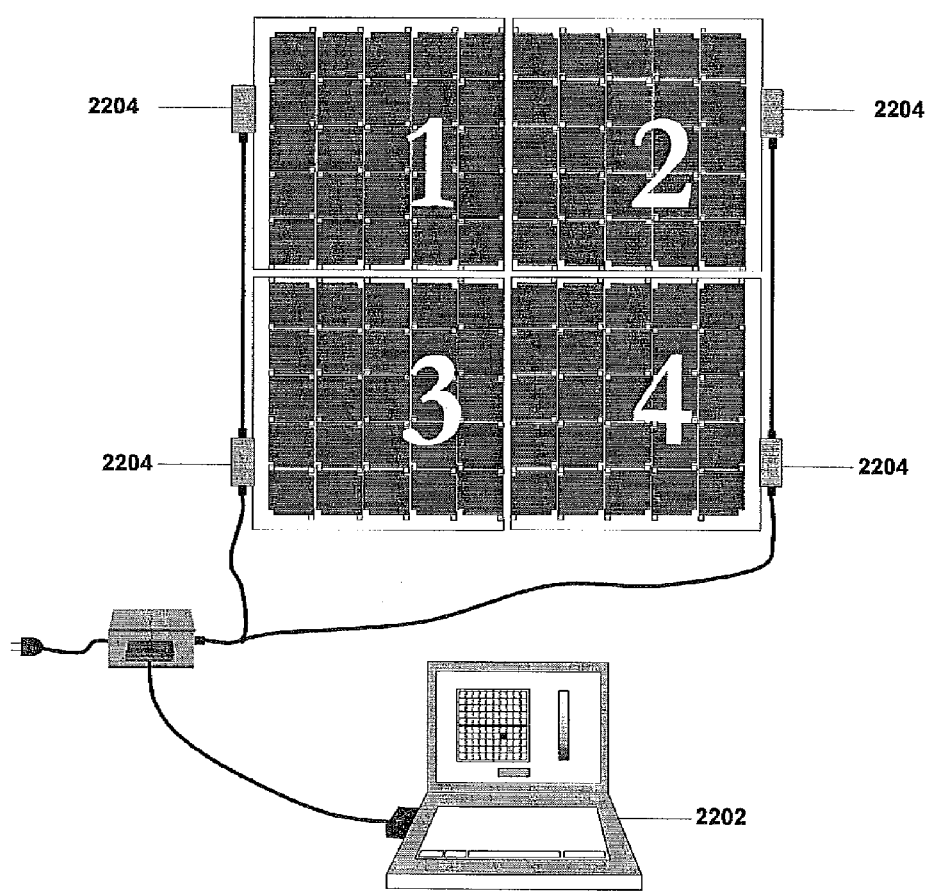
FIG. 22 illustrates an initial 4 by 4 test module being driven by the optimal MLA strategy.

FIG. 22 illustrates a modular system using a prototype design consisting of four square modules of 25 pixels (each module labeled internally as '1', '2', '3', and '4'). Each pixel has dimensions of 9 cm a side. The use of four baseline modules exploits the idea of modularity and flexibility of design. These 25 pixel modules could themselves be arranged in a 2×2 matrix configuration, displaying forms or shapes, or if preferred in a 1×4 vector configuration to display information along the lines of alphanumeric characters. Therefore, while the final aggregate design is a coordinated and integrated information display system, it is actually made up of a network of these baseline modules. The motivation behind this feature is the lack of uniformity in the design of buildings and surfaces where this programmable window can be applied.

The final prototype is intended to be the basic necessary hardware and firmware platform to interface the switching circuitry 2204 to a higher-level control entity such as a laptop computer 2202. This abstracted design requires only software-level changes to accommodate many other applications such as the display of different successive images.

Another important design characteristic is the use of an adjacent switchbox. Each baseline module is composed of a panel, on-panel signal buses, and a peripheral switching circuit. Wire resistance and switching capacitances should be minimized, accounting for the on board location of the routing or switching box—effectively as close to the pixels as possible. The power and control signal lines are, in addition, routed using 13-Pin Mini Din connectors and low resistance and power-loss lines.

This need to have the control box adjacent to the switching panel imposes a constraint on its maximum size and explains the basis for the need to resort to a solution based on integrated circuits. Given the size constraint, the idea is to try and minimize hardware overhead. The clearest choice is using a single microcontroller to run the switching times, handle bi-directional communications, and implement the on board image update processes. Controlling the timing and switching in software eliminates the need for shift registers, digital comparators and additional supporting ICs. A printed circuit board was also designed in order to minimize the size of the on-board control circuits.

Figure 23:
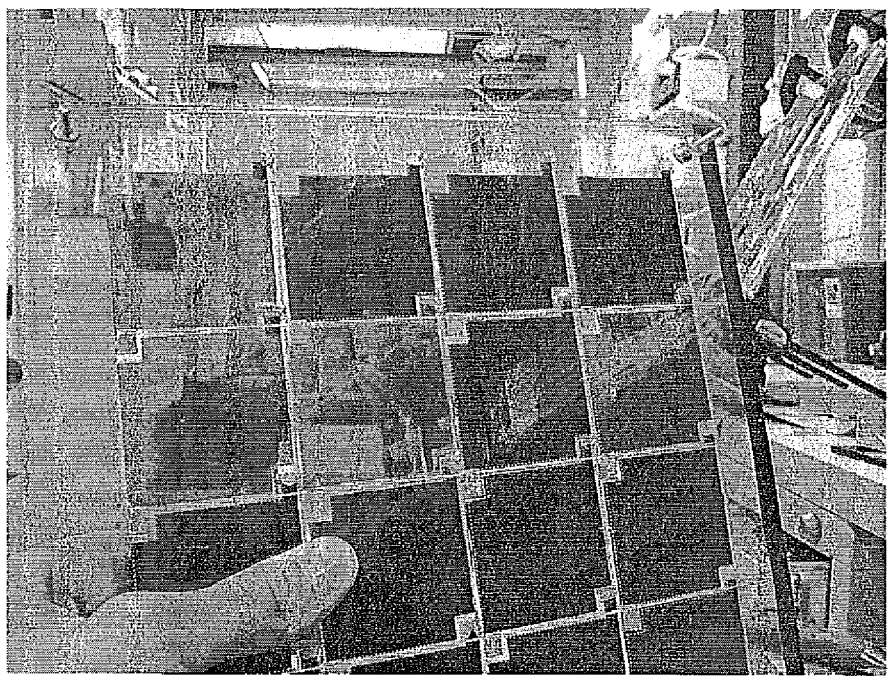
FIG. 23 illustrates a 4×4 panel with activated cells.
Figure 24:
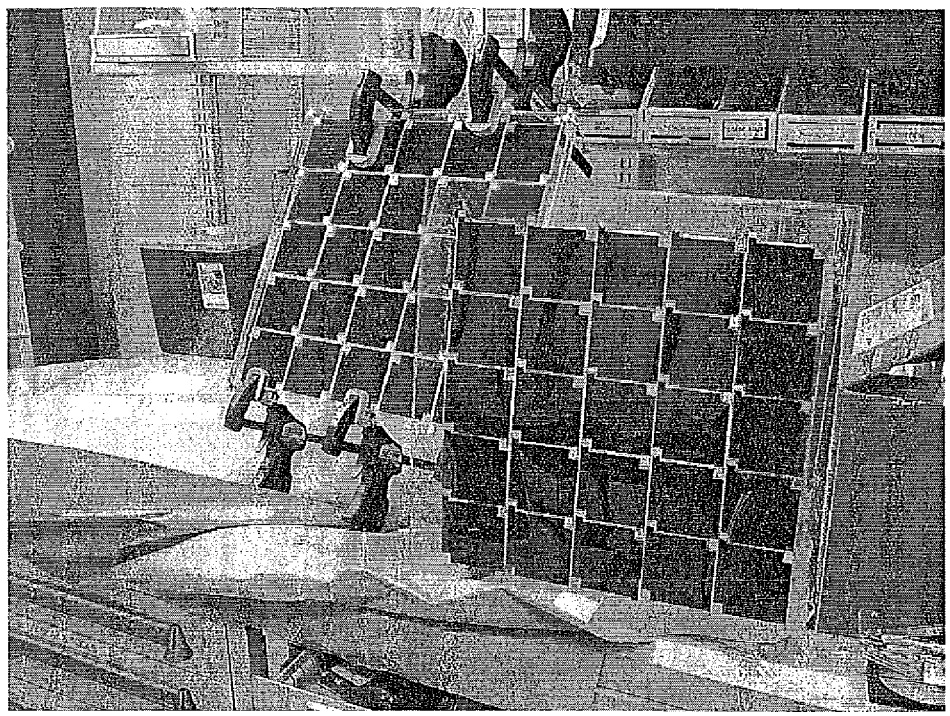
FIG. 24 illustrates a prototype having 25 pixel sub-module.

FIG. 23 illustrates an initial 4×4 test module being driven by the optional MLA strategy. FIG. 24 illustrates a prototype having 25-pixel sub-modules.

Additionally, the present invention provides for an article of manufacture comprising computer readable program code contained within controlling one or more modules implementing shading control in a large scale transparent electronic display using SPD Film. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

CONCLUSION

A method has been shown in the above embodiments for the effective implementation of a programmable window—a device for controlling the opacity of small-scale areas within a large-scale transparent membrane. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by hardware materials, software/program, computing environment, or specific computing hardware.

The above enhancements are implemented in various computing environments. For example, the present invention may be implemented on a conventional IBM PC, an equivalent, multi-nodal system (e.g., LAN), or on a networking system (e.g., Internet, WWW, wireless web). All programming and data related thereto are stored in computer memory, static or dynamic, and may be retrieved by the user via: conventional computer storage, display (i.e., CRT), and/or hardcopy (i.e., printed) formats.

The invention claimed is:

1. A method to affect natural lighting profiles in a programmable window made from a single transparent membrane, said method comprising:
    forming a matrix comprising a plurality of pixel elements within said single transparent membrane, each of said one or more pixels being wired using a transparent conductor and capable of being independently driven to control opacity, wherein opacity of each pixel being controlled by applying a voltage level selected among a range of voltage levels, said range of voltage levels being more than a binary range;
    setting in a programmable controller, a first degree of shading in a first pixel in said matrix of pixel elements and a second degree of shading in a second pixel in said matrix, said first degree of shading different in value than said second degree of shading;
    receiving one or more control commands from said programmable controller, said control commands issued to control opacity of said first and second pixel elements in said matrix;
    in response to said one or more control commands, independently driving said first and second pixel within said single transparent membrane to said first degree of shading and second degree of shading, respectively, and
    wherein said first degree of shading in said first pixel within said single transparent membrane and second degree of shading in said second pixel within said single transparent membrane is controlled by controlling a first percentage of light transmitted through said first pixel and by controlling a second percentage of light transmitted through said second pixel according to control commands issued by said programmable controller.

2. The method of claim 1, wherein each pixel element comprises two transparent layers with suspended particles held between said transparent layers.

3. The method of claim 2, wherein said suspended particles become induced dipoles in the presence of an electric field, said electric field controllable via said controller.

4. The method of claim 1, wherein each element in said matrix comprises a layer of suspended particles sandwiched between layers of transparent glass.

5. The method of claim 1, wherein each of the pixels is driven using a dual MOSFET totem topology.

* * * * *